US010009594B2

(12) United States Patent
Nanri et al.

(10) Patent No.: US 10,009,594 B2
(45) Date of Patent: Jun. 26, 2018

(54) STEREO IMAGE PROCESSING DEVICE AND STEREO IMAGE PROCESSING METHOD

(71) Applicant: Panasonic Intellectual Property Management Co., Ltd., Osaka (JP)

(72) Inventors: Takuya Nanri, Kanagawa (JP); Hisashi Kurokawa, Osaka (JP); Takeshi Ishihara, Osaka (JP); Hirofumi Nishimura, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 80 days.

(21) Appl. No.: 14/431,089

(22) PCT Filed: Jul. 4, 2013

(86) PCT No.: PCT/JP2013/004162
§ 371 (c)(1),
(2) Date: Mar. 25, 2015

(87) PCT Pub. No.: WO2014/049919
PCT Pub. Date: Apr. 3, 2014

(65) Prior Publication Data
US 2015/0249814 A1 Sep. 3, 2015

(30) Foreign Application Priority Data
Sep. 27, 2012 (JP) ................................. 2012-214974

(51) Int. Cl.
*H04N 13/02* (2006.01)
*H04N 9/80* (2006.01)
(Continued)

(52) U.S. Cl.
CPC ....... *H04N 13/0203* (2013.01); *G01B 11/026* (2013.01); *G06T 7/593* (2017.01);
(Continued)

(58) Field of Classification Search
USPC .......................... 386/223–224, 239–248, 341
See application file for complete search history.

(56) References Cited

U.S. PATENT DOCUMENTS 5,867,591 A * 2/1999 Onda ..................... G01C 11/06
348/43
2009/0304266 A1 12/2009 Aoki et al.
(Continued)

FOREIGN PATENT DOCUMENTS

EP 246293 A1 2/2012
EP 2416293 A1 2/2012
(Continued)

OTHER PUBLICATIONS

Fleet, David J., Disparity from Local Weighted Phase-Correlation, Oct. 1994.*
(Continued)

*Primary Examiner* — Hung Dang
(74) *Attorney, Agent, or Firm* — Pearne & Gordon LLP

(57) ABSTRACT

Device (100) comprises: a stereo image acquisition unit (101) for acquiring a standard image and a reference image for a stereo image; an image segmenting unit (102) for acquiring standard pixel data and reference pixel data from the stereo image; a phase correction unit (103) for carrying out for each of the pixel data a phase correction process making the values of the standard pixel data more symmetrical; a windowing unit (104) for applying a windowing function to each of the pixel data that have undergone phase correction; a phase correlation unit 105 for calculating a phase correlation value between the two pixel data that have
(Continued)

undergone windowing; and a peak position detection unit (106) for calculating, on the basis of the phase correlation value, the parallax of a corresponding point of the reference image with respect to a standard point on the standard image.

3 Claims, 16 Drawing Sheets

(51) Int. Cl.
G01B 11/02 (2006.01)
H04N 13/00 (2018.01)
G06T 7/593 (2017.01)

(52) U.S. Cl.
CPC .............. *H04N 13/0007* (2013.01); *G06T 2207/10012* (2013.01); *G06T 2207/20056* (2013.01); *G06T 2207/30261* (2013.01)

(56) References Cited

U.S. PATENT DOCUMENTS

2012/0026295 A1* 2/2012 Nishimura ............. G01B 11/26 348/46
2013/0147922 A1 6/2013 Nanri et al.

FOREIGN PATENT DOCUMENTS

| JP | 2005-055931 A | 3/2005 |
| JP | 2006-221365 A | 8/2006 |
| JP | 2008-123141 A | 5/2008 |
| WO | 2012/086173 A1 | 6/2012 |

OTHER PUBLICATIONS

Ulusoy, Ilkay et al., Disparity Using Feature Points in Multi Scale, Jan. 15, 2002.*
Supplementary European Search Report for Application No. 13840237.5 dated Aug. 24, 2015.
Udo Ahlvers, et al., "Improvement of phase-based algorithms for disparity estimation by means of magnitude information", Image Processing, 2004. ICIP '04. 2004 International Conference on Singapore, Oct. 24-27, 2004, pp. 3025-3028, vol. 5, DOI: 10.1109/ICIP.2004.1421750, ISBN: 978-0-7803-8554-2, Piscataway, NJ, USA, XP010786434.
Takuma Shibahara, et al., "A Sub-Pixel Stereo Correspondence Technique Based on 1D Phase-only Correlation", Image Processing, 2007. ICIP 2007. IEEE International Conference on, IEEE, PI, Sep. 1, 2007, pp. V-221, ISBN: 978-1-4244-1436-9, p. 222, right-hand column, last paragraph, Japan, XP031158525.
Takeshi Arai, et al.,Fine image matching for narrow baseline stereovision:, Geoscience and Remote Sensing Symposium (IGARSS), 2012 IEEE International, IEEE, Jul. 22, 2012, pp. 2336-2339, DOI: 10.1109/IGARSS.2012.6351026, ISBN: 978-1-4673-1160-1, p. 2338, left-hand column, paragraph 2, Tokyo, Japan, XP032468871.
International Search Report for Application No. PCT/JP2013/004162 dated Sep. 3, 2013.
Takafumi Aoki, "High-Accuracy Machine Vision Using Phase-Only Correlation", IEICE Fundamentals Review, Jul. 2007, vol. I, No. I, pp. 30 to 40.
Hirofumi Nishimura, "Development of image sensing technology for automotive field", Panasonic Technical Journal, Oct. 15, 2011 (Oct. 15, 2011), vol .57, No. 3, pp. 62 to 67.

* cited by examiner $$SAD(n) = \sum_{-wv/2}^{wv/2} \sum_{i=-wh/2}^{wh/2} \left| f(xa+i, ya+j) - g(xa+i+n, ya+j) \right|$$

FIG. 13A
TARGET IMAGE
FIG. 13B
REFERENCE IMAGE
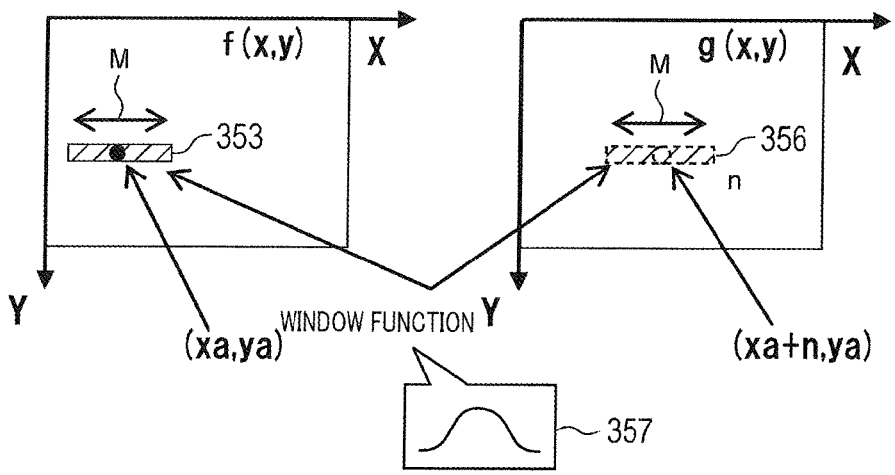
$$f'(m) = f(xa + m, ya) \times \left\{\cos(\pi \frac{m}{M})\right\}$$
$$g'(m) = g(xa + n + m, ya) \times \left\{\cos(\pi \frac{m}{M})\right\}$$
WHERE, $-\dfrac{M}{2} \leq m \leq \dfrac{M}{2}$
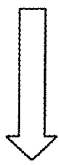
FIG. 13C
$$z(m) = \sum_{k=-M/2}^{M/2} f'(-k) \times g'(m-k)$$

STEREO IMAGE PROCESSING DEVICE AND STEREO IMAGE PROCESSING METHOD

TECHNICAL FIELD

The present invention relates to a stereo image processing apparatus and a stereo image processing method that calculate a disparity from a corresponding point in a reference image of a stereo image to a target point in a target image of the stereo image.

BACKGROUND ART

Stereo image processing apparatuses which measure a distance to a target have been known heretofore. Such a stereo image processing apparatus (hereinafter simply referred to as "stereo image processing apparatus") extracts, from a reference image, a corresponding point to a target image. Here, the "corresponding point" refers to a point at which an object identical to an object captured at a target point in a target image. The stereo image processing apparatus calculates a distance to an object based on a camera parameter and a disparity which represents a shift amount of a corresponding point relative to the target point.

Applications of stereo image processing apparatuses in consideration include a safety apparatus that measures a distance to a forward vehicle or a pedestrian captured by a vehicle-mounted camera. Such safety apparatuses are about to widespread also in small-sized automobiles in recent years. For this reason, there is a demand for miniaturization of stereo cameras used for stereo image processing apparatuses.

As the size of stereo camera decreases, the distance between a camera that captures a target image and a camera that captures a reference image decreases and a disparity decreases. For this reason, the stereo image processing apparatus is required to perform highly accurate disparity calculation.

A conventional technique disclosed in PTL 1 is an example of technology for highly accurate disparity calculation. According to this conventional technique, a disparity is calculated using one-dimensional POC (Phase Only Correlation) scheme.

More specifically, a one-dimensional pixel data sequence is clipped using a Hanning window from each of the target image and the reference image, and the clipped pixel data sequences are synthesized after performing one-dimensional Fourier transform. The related art normalizes the amplitude component of the synthesized data sequence and calculates a phase-only correlation coefficient by one-dimensional inverse Fourier transform. In addition, the related art calculates a disparity based on the correlation peak of the calculated phase-only correlation coefficient.

CITATION LIST

Patent Literature

PTL 1
Japanese Patent Application Laid-Open No. 2008-123141

SUMMARY OF INVENTION

Technical Problem

However, with the related art, it is difficult to calculate a disparity highly accurately for an object having a small image region size in the baseline length direction. Here, the "an image region size in the baseline length direction" is a size of the image region in the baseline length direction on a stereo image.

Examples of the object having a small image region size in the baseline length direction include a pedestrian located at a position far from a camera. Especially when the stereo image processing apparatus is applied to the above-described safety apparatus, the stereo image processing apparatus is preferably enabled to calculate a disparity with higher accuracy also for an object having a small image region size in the baseline length direction.

It is an object of the present invention to provide a stereo image processing apparatus and a stereo image processing method capable of calculating disparity highly accurately even for an object having a small image region size in the baseline length direction.

Solution to Problem

A stereo image processing apparatus according to the present disclosure includes: a stereo image acquiring section that acquires a target image and a reference image of a stereo image; an image clipping section that clips partial images parallel to a baseline length direction of the stereo image from the target image and the reference image respectively and acquires one-dimensional pixel data sequences each indicating a distribution of pixel values of a corresponding one of the partial images in the baseline length direction; a phase correction section that performs a phase correction process on each of target pixel data and reference pixel data, the phase correction process being a process which makes values of the target pixel data more symmetric when applied to the target pixel data that is the one-dimensional pixel data sequence acquired from the target image, the reference pixel data being the one-dimensional pixel data sequence acquired from the reference image; a windowing section that performs windowing on phase-corrected target pixel data obtained by performing the phase correction process on the target pixel data and phase-corrected reference pixel data obtained by performing the phase correction process on the reference pixel data respectively; a phase correlation section that calculates a phase correlation value indicating a degree of correlation between windowed target pixel data obtained by performing the windowing on the phase-corrected target pixel data and windowed reference pixel data obtained by performing the windowing on the phase-corrected reference pixel data; and a peak position detecting section that calculates a disparity of a corresponding point in the reference image corresponding to a target point in the target image based on the phase correlation value.

A stereo image processing method according to the present disclosure includes: acquiring a target image and a reference image of a stereo image; clipping partial images parallel to a baseline length direction of the stereo image from the target image and the reference image respectively and acquiring one-dimensional pixel data sequences each indicating a distribution of pixel values of a corresponding one of the partial images in the baseline length direction; performing a phase correction process on each of target pixel data and reference pixel data, the phase correction process being a process which makes values of the target pixel data more symmetric when applied to the target pixel data that is the one-dimensional pixel data sequence acquired from the target image, the reference pixel data being the one-dimensional pixel data sequence acquired from the reference image; performing windowing on phase-corrected target pixel data obtained by performing the phase correction process on the target pixel data and phase-corrected reference pixel data obtained by performing the phase correction process on the reference pixel data respectively; calculating a phase correlation value indicating a degree of correlation between windowed target pixel data obtained by performing the windowing on the phase-corrected target pixel data and windowed reference pixel data obtained by performing the windowing on the phase-corrected reference pixel data; and calculating a disparity of a corresponding point in the reference image corresponding to a target point in the target image based on the phase correlation value.

Advantageous Effects of Invention

According to the present disclosure, a highly accurate disparity can be calculated for an object having a small image region size in the baseline length direction.

BRIEF DESCRIPTION OF DRAWINGS

FIGS. 13A to 13C are schematic diagrams illustrating an overview of processing from clipping of a partial image to calculation of an inverted phase filtering coefficient according to Embodiment 4;

DESCRIPTION OF EMBODIMENTS

Figure 1:
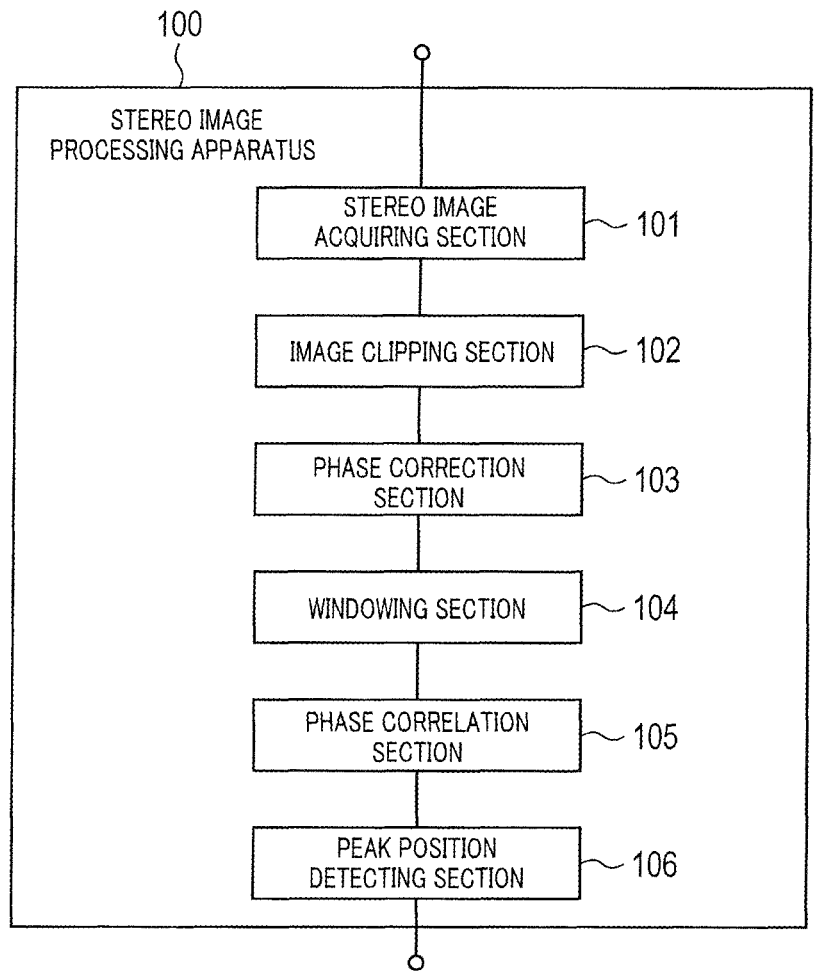
FIG. 1 is a block diagram illustrating an example of a configuration of a stereo image processing apparatus according to Embodiment 1.

The present invention relates to stereo image processing of comparing phase characteristics between data obtained by performing windowing on a pixel data sequence acquired from a target image and data obtained by performing windowing on a pixel data sequence acquired from a reference image, and thereby calculating a disparity of a stereo image. More specifically, the present invention relates to stereo image processing of calculating a phase difference between target pixel data and reference pixel data, and calculating a disparity based on the calculation result.

When calculating a phase difference in this way, an optimum shape of the window function used for the above-described windowing is a symmetrical one, both ends of which become zero so as to be continuous. However, when values of pixel data subject to windowing are significantly different from each other at both ends of pixel data, influences of windowing using such a window function on phase characteristics of pixel data are noticeable. An example of pixel data whose values are significantly different from each other at both ends of pixel data is an edge signal (pixel data corresponding to an edge portion of an object) in which a (first) intensity value at the left end of the pixel data is 0 and a (last) intensity value is 255.

In this respect, the present inventor has discovered that by making pixel data values symmetric, values of the pixel data would coincide with each other at both ends of the pixel data. That is, the present inventor has discovered that the closer to symmetry values of the pixel data subject to windowing, the more the influence of windowing on phase characteristics would be reduced.

Moreover, the present inventor has discovered that the number of pieces of pixel data subject to windowing (number of pieces of data subject to windowing) would greatly influence on phase characteristics of the windowed pixel data sequence. The greater the number of pieces of pixel data, the smaller the influence of windowing on phase characteristics becomes. However, as the number of pieces of pixel data decreases, the influence of windowing on phase characteristics increases drastically.

Thus, the present invention performs phase correction processing which is processing of making values of pixel data acquired from a target image more symmetric on both the pixel data sequence acquired from the target image and the pixel data sequence acquired from the reference image. That is, the present invention makes the two pieces of pixel data more symmetric while keeping the phase difference between the two pixel data sequences.

Thus, even when the number of pieces of pixel data is small, the present invention can reduce the influence of windowing on phase characteristics. This effect is especially large for an object having a small image region size in the baseline length direction. That is, the present invention performs the above-described phase correction processing, and can thereby prevent degradation of disparity calculation accuracy and calculate a disparity with high accuracy for an object having a small image region size in the baseline length direction.

Hereinafter, embodiments of the present invention will be described in detail with reference to the accompanying drawings.

Embodiment 1

Embodiment 1 of the present invention is an example of a basic mode of the present invention.

FIG. 1 is a block diagram illustrating a configuration example of a stereo image processing apparatus according to Embodiment 1 of the present invention.

In FIG. 1, stereo image processing apparatus 100 includes stereo image acquiring section 101, image clipping section 102, phase correction section 103, windowing section 104, phase correlation section 105 and peak position detecting section 106.

Stereo image obtaining section 101 obtains a target image and a reference image for a stereo image.

Image clipping section 102 clips partial images parallel to a baseline length direction of a stereo image from a target image and a reference image, respectively. Image clipping section 102 then acquires a one-dimensional pixel data sequence indicating a distribution of pixel values in the baseline length direction of each of the clipped partial images.

In the following description, the one-dimensional pixel data sequence acquired from the target image is referred to as "reference pixel data." On the other hand, the one-dimensional pixel data sequence acquired from the reference image is referred to as "reference pixel data."

Phase correction section 103 performs phase correction processing, which is processing of making values of the reference pixel data more symmetric when performed on the target pixel data, on the target pixel data and reference pixel data respectively.

In the following description, data obtained by performing phase correction processing on the target pixel data is referred to as "phase-corrected target pixel data." On the other hand, data obtained by performing phase correction processing on the reference pixel data is referred to as "phase-corrected reference pixel data."

Windowing section 104 performs windowing on the phase-corrected target pixel data and phase-corrected reference pixel data respectively.

In the following description, data obtained by performing windowing on the phase-corrected target pixel data is referred to as "windowed target pixel data." Meanwhile, data obtained by performing windowing on the phase-corrected reference pixel data is referred to as "windowed reference pixel data."

Phase correlation section 105 calculates a phase correlation value indicating a degree of correlation between the windowed target pixel data and the windowed reference pixel data.

Peak position detecting section 106 calculates a disparity of a corresponding point in a reference image to a target point in a target image based on the phase correlation value.

Stereo image processing apparatus 100 includes a CPU (central processing unit) and a storage medium such as a RAM (random access memory). In this case, each of the functional parts described above is implemented by a CPU executing a control program.

Thus, stereo image processing apparatus 100 according to the present embodiment performs phase correction processing which is processing of making values of target pixel data more symmetric on the target pixel data and reference pixel data respectively. Stereo image processing apparatus 100 according to the present embodiment performs windowing on the data subjected to phase correction processing and calculates a disparity at a corresponding point.

Thus, stereo image processing apparatus 100 can extract phase characteristics of target pixel data and phase characteristics of reference pixel data with influences of the windowing reduced. That is, stereo image processing apparatus 100 can also calculate a disparity with high accuracy also on an object having a small image region size in the baseline length direction such as a pedestrian far on a road.

Embodiment 2

Embodiment 2 of the present invention is an example of adopting phase correction processing such that signals in a whole frequency band of target pixel data is symmetric. In other words, the present embodiment is an example where accuracy improvement in disparity calculation is given higher priority over calculation load.

First, a configuration of a stereo image processing apparatus according to the present embodiment will be described.

Figure 2:
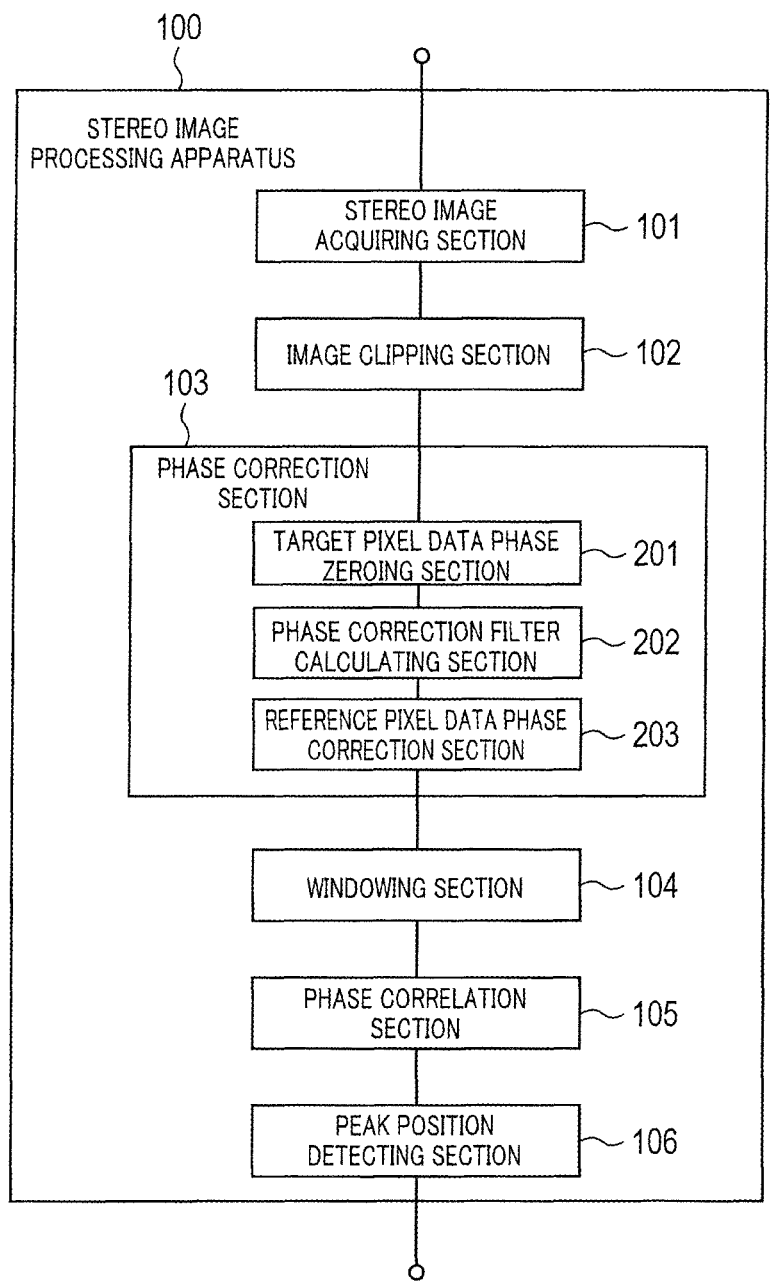
FIG. 2 is a block diagram illustrating a configuration example of a stereo image processing apparatus according to Embodiment 2.

In FIG. 2, stereo image processing apparatus 100 includes stereo image acquiring section 101, image clipping section 102, phase correction section 103, windowing section 104, phase correlation section 105 and peak position detecting section 106.

<Stereo Image Acquiring Section 101>

Stereo image acquiring section 101 acquires a target image and a reference image of a stereo image. Stereo image acquiring section 101 outputs the acquired target image and reference image to image clipping section 102.

More specifically, stereo image acquiring section 101 acquires stereo images captured by two or more image pickup systems (that is, two or more cameras). A stereo image includes a target image and a reference image obtained by capturing the same object by two different cameras. Stereo image acquiring section 101 includes a connector connected to a stereo camera for acquiring image data and receives a stereo image via the connector. Note that, in the embodiment, stereo image obtaining section 101 inputs a stereo image captured by two cameras having baseline-length directions substantially matching the horizontal direction.

<Image Clipping Section 102>

Image clipping section 102 clips partial images parallel to the baseline length direction of the stereo image from the target image and reference image respectively. Image clipping section 102 acquires a one-dimensional pixel data sequence indicating a distribution of pixel values of each of the clipped partial images in the baseline length direction. That is, image clipping section 102 acquires the target pixel data and reference pixel data. Image clipping section 102 then outputs the acquired target pixel data and reference pixel data to phase correction section 103.

The technique of clipping partial images which form the basis of a one-dimensional pixel data sequence needs only to well express the position of the object for disparity calculation in the clipped partial images as phase characteristics in the baseline length direction, and is not limited to any particular technique. Therefore, the partial images as the basis of the one-dimensional pixel data sequence may be ones having a large width in the baseline length direction and having a height in the direction orthogonal to the baseline length direction corresponding to one pixel. Alternatively, the partial images as the basis of the one-dimensional pixel data sequence may be ones having a large width in the baseline length direction and having a height in the direction orthogonal to the baseline length direction corresponding to a plurality of pixels. Furthermore, the partial images as the basis of the one-dimensional pixel data sequence may be a plurality of partial images having the same number of pixels and being separate from each other.

The technique of acquiring a one-dimensional pixel data sequence from each of the clipped partial images needs only to well express phase characteristics of the original partial images in the baseline length direction as the one-dimensional pixel data sequence, and is not limited to any particular technique.

Thus, for example, when the partial image has one row, image clipping section 102 can assume the pixel value data sequence to be the one-dimensional pixel data sequence without processing the sequence.

When the partial image is made up of a plurality of rows, image clipping section 102 can assume the one-dimensional data obtained by averaging the pixel values in a direction orthogonal to the baseline length direction to be a one-dimensional pixel data sequence. Image clipping section 102 can also assume one-dimensional data obtained by coupling a plurality of one-dimensional pixel value data sequences that extend in the baseline length direction and removing noise associated with the coupling to be a one-dimensional pixel data sequence. Image clipping section 102 can assume one-dimensional data obtained by reconstructing each pixel value such that the ratio of the distance before the reconstruction between given pixels included in the same pixel row to the distance after the reconstruction becomes identical among all pixels to be a one-dimensional pixel data sequence.

<Phase Correction Section 103>

Phase correction section 103 performs a phase correction process which is a process, when performed on target pixel data, of making the values of the target pixel data more symmetric, on the target pixel data and reference pixel data respectively. That is, phase correction section 103 performs phase correction processing on the target pixel data to thereby generate phase-corrected target pixel data. On the other hand, phase correction section 103 performs a phase correction process on the reference pixel data to thereby generate phase-corrected reference pixel data. Phase correction section 103 then outputs the phase-corrected target pixel data and the phase-corrected reference pixel data to windowing section 104.

More specifically, phase correction section 103 includes target pixel data phase zeroing section 201, phase correction filter calculating section 202, and reference pixel data phase correction section 203.

<Target Pixel Data Phase Zeroing Section 201>

Target pixel data phase zeroing section 201 performs a phase zeroing process of zeroing a phase of each frequency component on the target pixel data to thereby calculate phase-corrected target pixel data. Target pixel data phase zeroing section 201 then outputs the target pixel data, the reference pixel data and the calculated phase-corrected target pixel data to phase correction filter calculating section 202.

The phase zeroing process needs only to zero the phase of each frequency component of the target pixel data, and is not limited to any particular process. In the present embodiment, an assumption is made that phase correction section 103 performs, as a phase zeroing process, processes of one-dimensional Fourier transform on the target pixel data, removal of imaginary number components in the whole frequency band and one-dimensional inverse Fourier transform in this order. The removal of imaginary number components refers to zeroing the term of i of $\cos(\omega t)+i\sin(\omega t)$ expressed in complex number. As a result, the signal obtained by one-dimensional Fourier transform is transformed into a symmetric signal expressed by $\cos(\omega t)$.

In the following description, zeroing the phase of the target pixel data is referred to as "phase zeroing of target pixel data."

<Phase Correction Filter Calculating Section 202>

Phase correction filter calculating section 202 calculates a phase correction filter that makes the value of the target pixel data symmetric when applied to the target pixel data based on the target pixel data and phase-corrected target pixel data. Phase correction filter calculating section 202 outputs the phase-corrected target pixel data, the reference pixel data and the calculated phase correction filter to reference pixel data phase correction section 203.

The phase correction filter needs only to make the value of the target pixel data symmetric when applied to the target pixel data, and is not limited to any particular filter. For example, the phase correction filter can be an FIR (Finite Impulse Response) filter that zeros the phase of target pixel data. Phase correction filter calculating section 202 calculates an FIR filter, for example, by dividing a value obtained by applying one-dimensional Fourier transform to phase-corrected target pixel data by a value obtained by applying one-dimensional Fourier transform to the target pixel data and further applying one-dimensional inverse Fourier transform thereto.

<Reference Pixel Data Phase Correction Section 203>

Reference pixel data phase correction section 203 calculates phase-corrected reference pixel data by applying a phase correction filter to the reference pixel data. The reference pixel data phase correction section then outputs the phase-corrected target pixel data and the calculated phase-corrected reference pixel data to windowing section 104.

Applying the phase correction filter to the reference pixel data means, in other words, applying the same amount of phase shift as that of the phase zeroing applied to the target pixel data to the reference pixel data. That is, phase correction section 103 can correct the respective phases so as to be symmetric by leaving the phase difference between the target pixel data and reference pixel data without processing.

<Windowing Section 104>

Windowing section 104 performs windowing on phase-corrected target pixel data and phase-corrected reference pixel data. That is, windowing section 104 performs windowing on the phase-corrected target pixel data and thereby generates windowed target pixel data. Windowing section 104 performs windowing on phase-corrected reference pixel data and thereby generates windowed reference pixel data. Windowing section 104 outputs the acquired windowed target pixel data and the windowed reference pixel data to phase correlation section 105.

The window function used for windowing needs only to be symmetric and have a shape such that both ends are continuous at zero, and is not limited to any particular technique. Therefore, a Hanning window, Blackman window, Kaiser window or the like may be used as the window function. In the present embodiment, windowing section 104 adopts a Hanning window.

<Phase Correlation Section 105>

Phase correlation section 105 calculates a phase correlation value indicating a degree of correlation between the windowed target pixel data and the windowed reference pixel data. Phase correlation section 105 then outputs the calculated phase correlation value to peak position detecting section 106.

As the method of calculating a phase correlation value, one-dimensional POC scheme using one-dimensional Fourier transform is available but a scheme using an inverted phase filter is optimum when the amount of calculation is taken into account. The technique using the inverted phase filter will be described later in Embodiment 4. The method of calculating a phase correlation value needs only to calculate a phase correlation, and is not limited to any particular technique.

<Peak Position Detection Section 106>

Peak position detecting section 106 calculates a disparity at a corresponding point of a reference image corresponding to a target point of a target image based on a phase correlation value.

Stereo image processing apparatus 100 includes, for example, a CPU and a storage medium such as a RAM. In this case, each of the functional parts described above is implemented by a CPU executing a control program.

Such stereo image processing apparatus 100 can leave a phase difference between the target pixel data and the reference pixel data as information while converting a phase to zero at all frequencies in the reference pixel data. For this reason, stereo image processing apparatus 100 can calculate a disparity with high accuracy without being affected by the window function at any frequency.

Next, the operation of stereo image processing apparatus 100 will be described.

Figure 3:
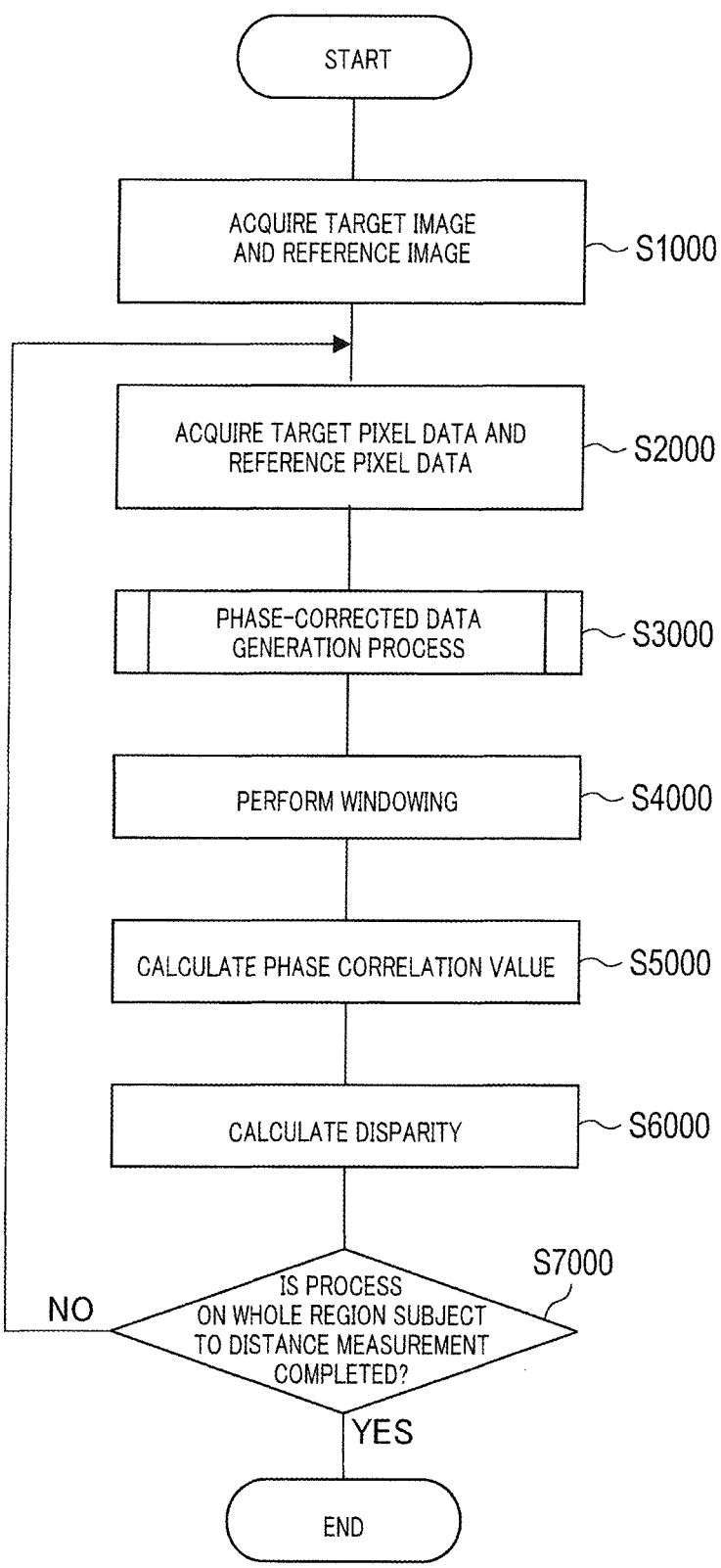
FIG. 3 is a flowchart illustrating an operation example of the stereo image processing apparatus according to Embodiment 2.

FIG. 3 is a flowchart illustrating an example of operation of stereo image processing apparatus 100.

In step S1000, stereo image acquiring section 101 acquires a target image and a reference image of a stereo image.

In step S2000, image clipping section 102 clips partial images parallel to the baseline length direction of the stereo image from the target image and the reference image, and acquires target pixel data and reference pixel data.

In step S3000, phase correction section 103 performs a phase-corrected data generation process.

The phase-corrected data generation processing is a process of preforming phase correction processing which is a process, when performed on target pixel data, of making the values of the target pixel data more symmetric, to the target pixel data, and the reference pixel data respectively. That is, the phase-corrected data generation process is a process of generating phase-corrected target pixel data and phase-corrected reference pixel data. In the present embodiment, the phase correction processing is the above-described phase zeroing process.

Figure 4:
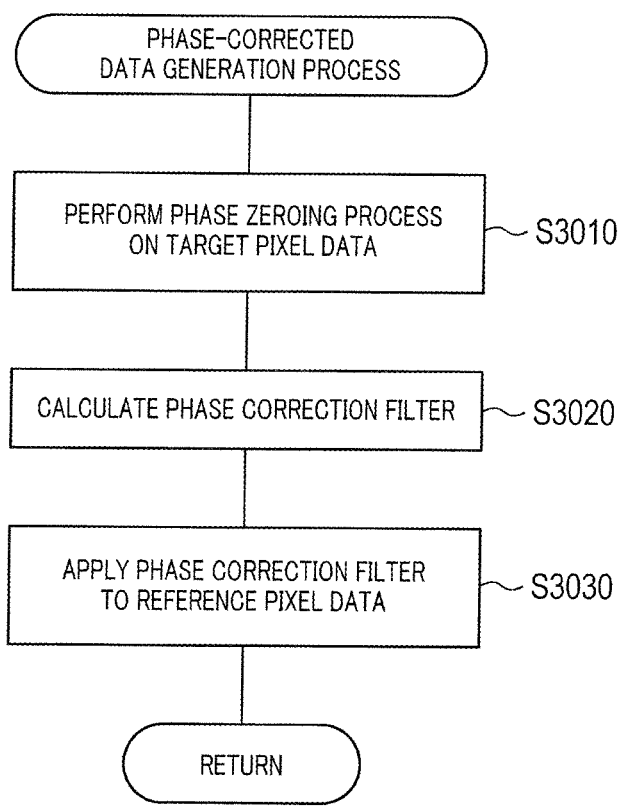
FIG. 4 is a flowchart illustrating an example of phase-corrected data generation processing according to Embodiment 2.

FIG. 4 is a flowchart illustrating an example of a phase-corrected data generation process (step 3000 in FIG. 3).

First, in step S3010, target pixel data phase zeroing section 201 performs a phase zeroing process on the target pixel data.

In step S3020, phase correction filter calculating section 202 calculates a phase correction filter.

In step S3030, reference pixel data phase correction section 203 applies the phase correction filter to the reference pixel data. The process of stereo image processing apparatus 100 returns to the flowchart in FIG. 3.

In step S4000 in FIG. 3, windowing section 104 performs windowing on the phase-corrected target pixel data and the phase-corrected reference pixel data respectively.

In step S5000, phase correlation section 105 calculates a phase correlation value between the windowed target pixel data and the windowed reference pixel data.

In step S6000, peak position detecting section 106 calculates a disparity at a corresponding point of a reference image corresponding to a reference point of a target image based on the phase correlation value.

In step S7000, image clipping section 102 determines whether or not the processes from the setting of a target position of clipping of a partial image to the disparity calculation is completed for the whole region subject to distance measurement.

When the processing on the whole region subject to distance measurement is not completed (S7000: NO), image clipping section 102 moves the target position of clipping of the partial image to the remaining region and returns to step S2000. Hereinafter, such a target position is referred to as "clipping target position." On the other hand, when the process is completed on the whole region distance measurement (S7000: YES), image clipping section 102 ends a series of processes.

Through the above-described operation, stereo image processing apparatus 100 can calculate a disparity with high accuracy without being affected by the window function at any frequency at each corresponding point within the region subject to distance measurement.

As described above, stereo image processing apparatus 100 according to the present embodiment performs a phase zeroing process of applying phase zeroing to target pixel data in the whole frequency domain on the target pixel data and the reference pixel data respectively. Stereo image processing apparatus 100 according to the present embodiment performs windowing on the data subjected to the phase zeroing process and calculates a disparity at a corresponding point.

Thus, with the influence of windowing suppressed to a minimum, stereo image processing apparatus 100 can extract phase characteristics of target pixel data and phase characteristics of reference pixel data respectively. That is, stereo image processing apparatus 100 can calculate a disparity with higher accuracy for an object having a small image region size in the baseline length direction.

Embodiment 3

Embodiment 3 of the present invention is an example of adopting a phase correction process such that only signals in a frequency band dominant over target pixel data are made symmetric. In other words, the present embodiment is an example where the reduction of calculation load is given higher priority over the accuracy of disparity calculation. Here, the frequency band dominant over target pixel data is, for example, a frequency band whose amplitude component is greater than other frequency bands.

First, a configuration of a stereo image processing apparatus according to the present embodiment will be described.

Figure 5:
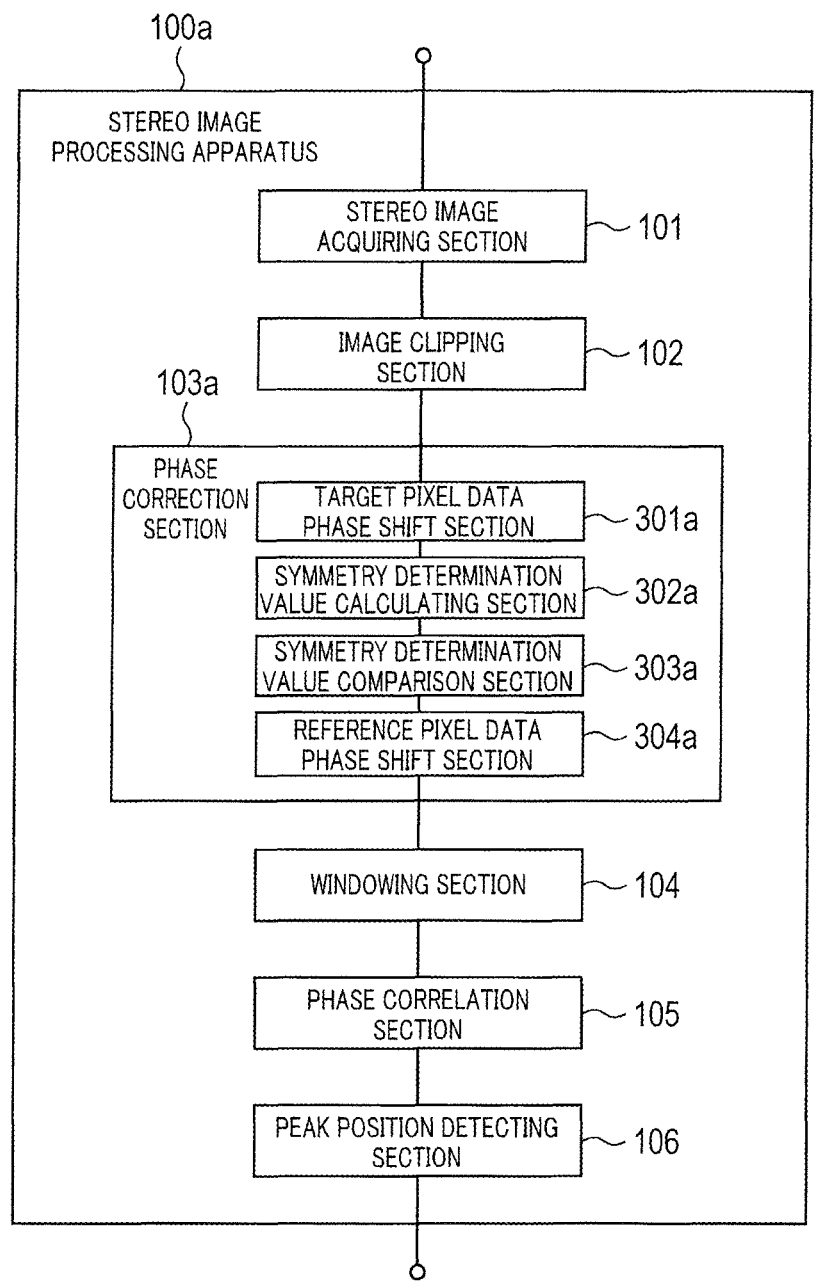
FIG. 5 is a block diagram illustrating an example of a configuration of a stereo image processing apparatus according to Embodiment 3.

FIG. 5 is a block diagram illustrating an example of a configuration of a stereo image processing apparatus according to Embodiment 3, and corresponds to FIG. 2 in Embodiment 2. The same reference numerals are assigned to the part identical to FIG. 2, and the description for these components is omitted.

In FIG. 5, stereo image processing apparatus 100a includes phase correction section 103a instead of phase correction section 103 in FIG. 2.

Phase correction section 103a performs a phase correction process which is a process, when performed on target pixel data, of making the values of the target pixel data more symmetric, to the target pixel data and reference pixel data respectively. That is, phase correction section 103a performs a phase correction process on target pixel data and thereby generates phase-corrected target pixel data. Phase correction section 103a performs a phase correction process on reference pixel data, and thereby generates phase-corrected reference pixel data. Phase correction section 103a then outputs the phase-corrected target pixel data and phase-corrected reference pixel data to windowing section 104.

However, when the effect of the above-described phase correction process is low, phase correction section 103a according to the present embodiment handles the target pixel data and reference pixel data as phase-corrected target pixel data and phase-corrected reference pixel data without processing the data.

More specifically, phase correction section 103a includes target pixel data phase shift section 301a, symmetry determination value calculating section 302a, symmetry determination value comparison section 303a and reference pixel data phase shift section 304a.

<Target Pixel Data Phase Shift Section 301a>

Target pixel data phase shift section 301a applies a phase shift filter that shifts the phase of some or all frequency components by 90 degrees to target pixel data and calculates phase-shifted target pixel data. Target pixel data phase shift section 301a outputs the target pixel data, the reference pixel data, and the calculated phase-shifted target pixel data to symmetry determination value calculating section 302a.

The phase shift filter, when applied to target pixel data, needs only to shift the phase of some or all frequency components by 90 degrees, and is not limited to any particular filter. In the present embodiment, the phase shift filter is assumed to be an FIR filter that simply brings some or all frequencies of target pixel data to zero, and more specifically, a differential filter that shifts the phase by 90 degrees at some frequencies.

FIGS. 6A to 6D are diagrams provided for describing effects of the differential filter. In FIG. 6A to FIG. 6D, the horizontal axis shows a position (X) of target pixel data in an array direction and the vertical axis shows a pixel value (e.g., intensity) or a differential value thereof.

Figure 6A:
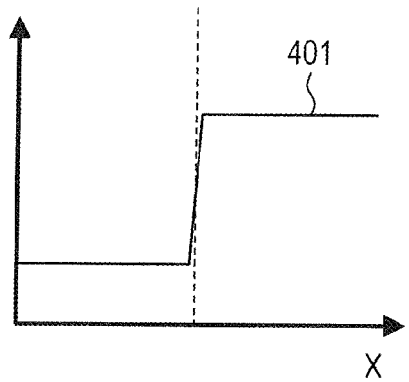
FIGS. 6A to 6D are diagrams provided for describing effects of a differential filter according to Embodiment 3.
Figure 6B:
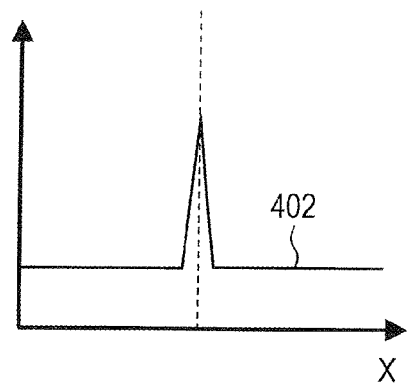

As shown in FIG. 6A, suppose that certain target pixel data is pixel value signal 401 whose intensity increases step-wise near the center. Differentiating this pixel value signal 401 with respect to X gives pixel value differential data 402 having a pulse shape near the center as shown in FIG. 6B.

Figure 6C:
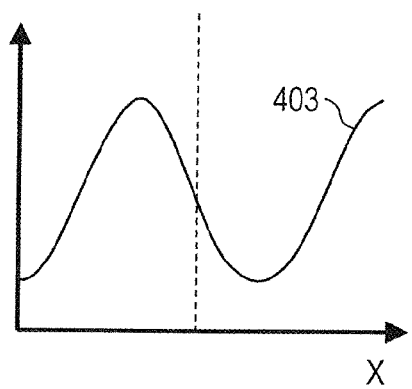
Figure 6D:
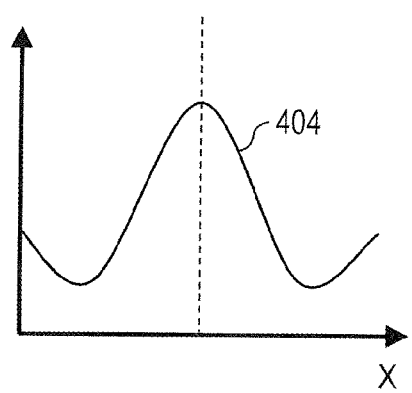

Furthermore, as shown in FIG. 6C, suppose certain target pixel data is pixel value signal 403 having a phase of approximately 90 degrees. Differentiating this pixel value signal 403 with respect to X gives pixel value differential data 404 as shown in FIG. 6D having a phase of approximately 0 degrees.

When the phase of the signal is approximately 0 or 180 degrees, the influence of applying a window function to the signal on phase characteristics is small. In contrast, when the phase of the signal is approximately 90 degrees, the influence of applying a window function to the signal on phase characteristics is large. For this reason, it is possible to reduce influences of the window function by applying a differential filter that can shift the phase to 0 degrees or 180 degrees to a signal having a phase of 90 degrees.

Although the differential filter is not intended to make a 90-degree phase shift of the whole band of a digital signal, the differential filter can phase-shift at least part of the band and reduce influences of the window function.

However, among actual signals, there are many signals whose phase is not in the vicinity of 90 degrees. For example, when there are many signals whose phase is in the vicinity of 0 degrees or 180 degrees, applying a differential filter thereto may rather result in a loss of symmetry.

Thus, stereo image processing apparatus 100a adopts the result of the phase correction process only when the result of phase shift filtering shows that the symmetry of the target pixel data improves. This will be described hereinafter.

<Symmetry Determination Value Calculating Section 302a>

Symmetry determination value calculating section 302a calculates symmetry determination values indicating the symmetry of a value regarding phase-shifted target pixel data and target pixel data respectively. Symmetry determination value calculating section 302a then outputs the target pixel data, the reference pixel data, the phase-shifted target pixel data and the calculated symmetry determination value to symmetry determination value comparison section 303a.

The symmetry determination value needs only to indicate symmetry of the value of one-dimensional data, and is not limited to any particular index value. For example, symmetry determination value calculating section 302a calculates symmetry determination value Sym0 of the target pixel data and symmetry determination value Sym1 of the phase-shifted target pixel data using equations 1 and 2 below. Here, $I_0(x)$ ($1 \le x \le m$, m: odd number) is target pixel data and $I_1(x)$ ($1 \le x \le m$, m: odd number) is phase-shifted target pixel data. The higher the level of symmetry, the greater are symmetry determination values Sym0 and Sym1 calculated by equations 1 and 2.

[1]
$$\mathrm{Sym0} = -\Sigma |I_0(i) - I_0(m+1-i)| (1 \le i \le (m-1)/2) \quad \text{(Equation 1)}$$

[2]
$$\mathrm{Sym1} = -\Sigma |I_1(i) - I_1(m+1-i)| (1 \le i \le (m-1)/2) \quad \text{(Equation 2)}$$

<Symmetry Determination Value Comparison Section 303a>

Symmetry determination value comparison section 303a compares the symmetry determination value calculated from the phase-shifted target pixel data with the symmetry determination value calculated from the target pixel data. Symmetry determination value comparison section 303a determines whether or not the level of symmetry of the phase-shifted target pixel data is higher than the level of symmetry of the target pixel data.

In addition to the target pixel data, reference pixel data and phase-shifted target pixel data, symmetry determination value comparison section 303a outputs information indicating the pixel data having a higher level of symmetry (that is, the pixel data having a greater symmetry determination value) to reference pixel data phase shift section 304a. That is, symmetry determination value comparison section 303a outputs information indicating whether or not the level of symmetry of phase-shifted target pixel data is higher than the level of symmetry of target pixel data to reference pixel data phase shift section 304a.

In the following description, the case where the level of symmetry of the phase-shifted target pixel data is higher than the level of symmetry of the target pixel data is referred to as a "case where the phase shift is effective." Meanwhile, the case where the level of symmetry of the phase-shifted target pixel data is not higher than the level of symmetry of the target pixel data is referred to as a "case where the phase shift is ineffective."

<Reference Pixel Data Phase Shift Section 304a>

Reference pixel data phase shift section 304a applies a phase shift filter to the reference pixel data and calculates phase-shifted reference pixel data. Note that reference pixel data phase shift section 304a may also calculate phase-shifted reference pixel data only when the phase shift is effective. When the phase shift is effective, reference pixel data phase shift section 304a outputs phase-shifted target pixel data and phase-shifted reference pixel data to windowing section 104 as phase-corrected target pixel data and phase-corrected reference pixel data respectively.

When the phase shift is ineffective, reference pixel data phase shift section 304a outputs target pixel data and reference pixel data to windowing section 104 as phase-corrected target pixel data and phase-corrected reference pixel data respectively.

As a result, when the phase shift is effective, windowing section 104 handles the phase-shifted target pixel data and phase-shifted reference pixel data as phase-corrected target pixel data and phase-corrected reference pixel data respectively. On the other hand, when the phase shift is ineffective, windowing section 104 handles the target pixel data and reference pixel data as phase-corrected target pixel data and phase-corrected reference pixel data respectively.

Stereo image processing apparatus 100a includes a CPU and a storage medium such as a RAM. In this case, the respective functions are implemented by the CPU executing a control program.

Next, the operation of stereo image processing apparatus 100a will be described.

Figure 7:
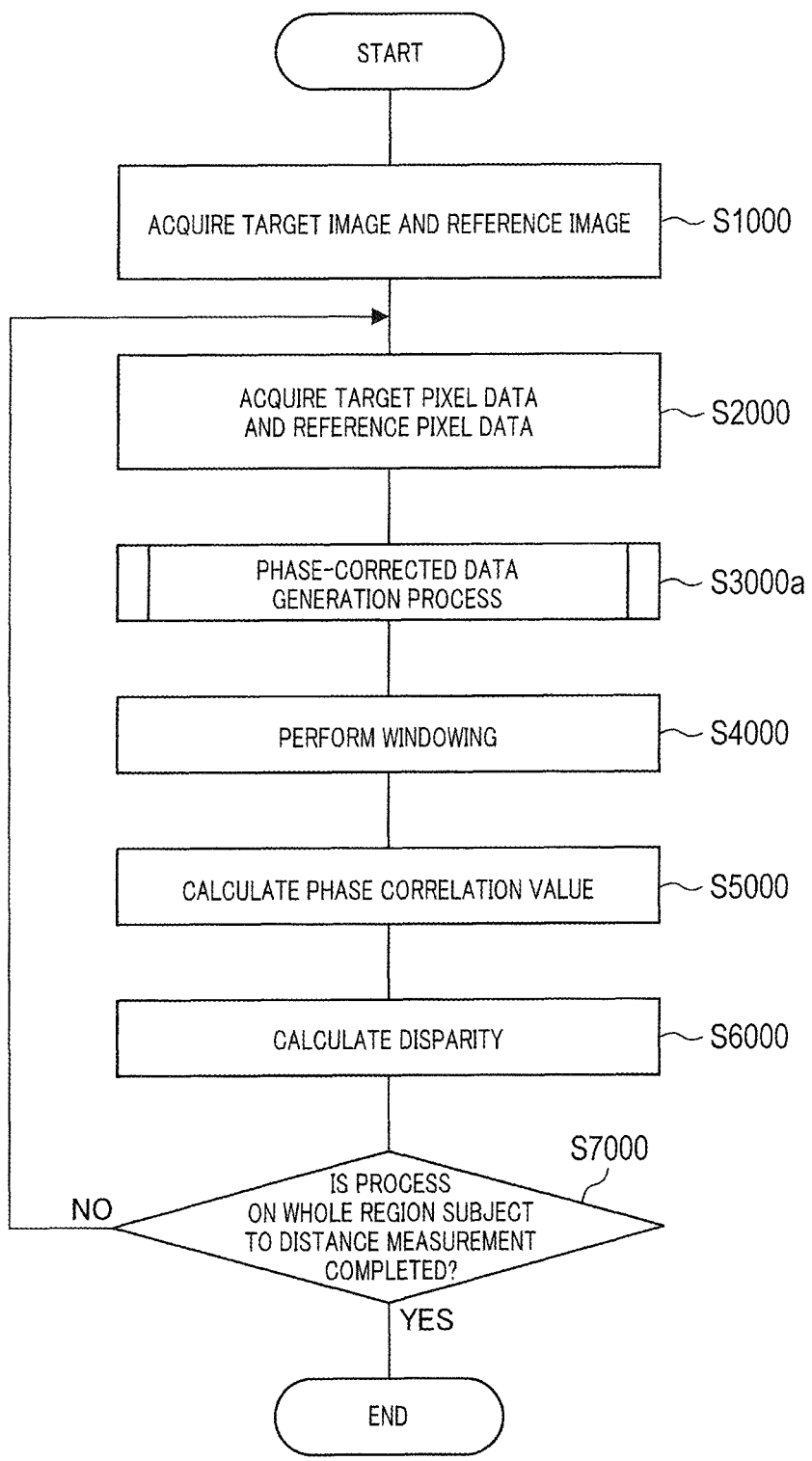
FIG. 7 is a flowchart illustrating an operation example of a stereo image processing apparatus according to Embodiment 3.

FIG. 7 is a flowchart illustrating an example of the operation of stereo image processing apparatus 100a and corresponds to FIG. 3 in Embodiment 2. The same reference numerals are assigned to the part identical to FIG. 3, and the description for these components is omitted. Stereo image processing apparatus 100a executes a process in step S3000a in FIG. 7 instead of the process in step S3000 in FIG. 3.

Figure 8:
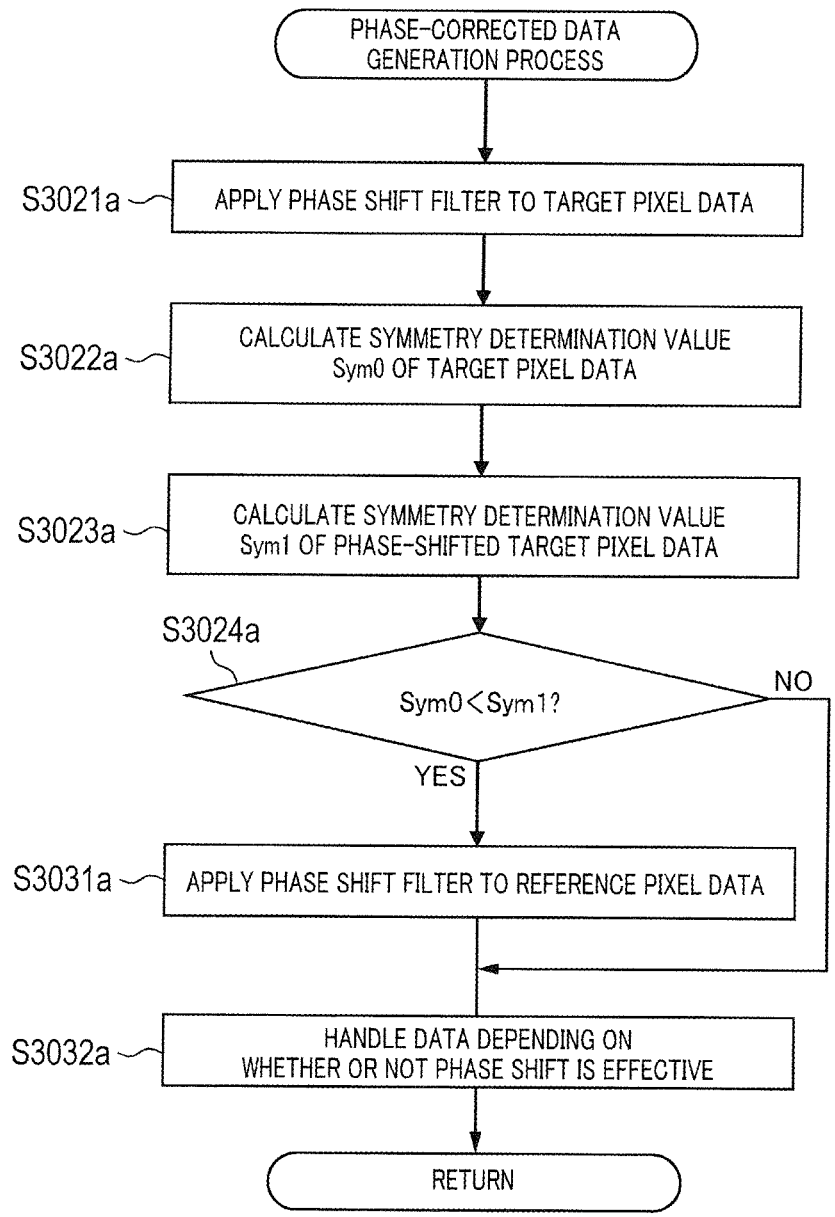
FIG. 8 is a flowchart illustrating an example of phase-corrected data generation processing according to Embodiment 3.

FIG. 8 is a flowchart illustrating an example of phase-corrected data generation process (step 3000a in FIG. 7).

First, in step S3021a, target pixel data phase shift section 301a applies the above-described phase shift filter to target pixel data.

In step S3022a, symmetry determination value calculating section 302a calculates symmetry determination value Sym0 of target pixel data.

In step S3023a, symmetry determination value calculating section 302a calculates symmetry determination value Sym1 of phase-shifted target pixel data.

In step S3024a, symmetry determination value comparison section 303a determines whether or not symmetry determination value Sym1 of the phase-shifted target pixel data is greater than symmetry determination value Sym0 of the target pixel data.

When symmetry determination value Sym1 is greater than symmetry determination value Sym0 (S3024a: YES), symmetry determination value comparison section 303a moves the process to step S3031a. When symmetry determination value Sym1 is equal to or less than symmetry determination value Sym0 (S3024a: NO), symmetry determination value comparison section 303a moves the process to step S3032a which will be described later.

In step S3031a, reference pixel data phase shift section 304a applies a phase shift filter to reference pixel data.

In step S3032a, reference pixel data phase shift section 304a handles each piece of data depending on whether the phase shift is effective or not. That is, when the phase shift is effective, reference pixel data phase shift section 304a outputs phase-shifted target pixel data and phase-shifted reference pixel data to windowing section 104. On the other hand, when the phase shift is ineffective, reference pixel data phase shift section 304a outputs target pixel data and reference pixel data to windowing section 104. The process of stereo image processing apparatus 100a returns to the flowchart in FIG. 7.

Thus, stereo image processing apparatus 100a according to the present embodiment can make phase-corrected target pixel data and phase-corrected reference pixel data more symmetric using the phase shift filter. Using the phase shift filter, stereo image processing apparatus 100a according to the present embodiment can drastically reduce a calculation load compared to a case where the phase zeroing process according to Embodiment 2 is applied. When a differential filter is adopted or when the range of phase-shift targets is narrowed down to some bands, the calculation load is further reduced.

Therefore, stereo image processing apparatus 100a according to the present embodiment can calculate a disparity of an object having a small image region size in the baseline length direction with high accuracy with the calculation load reduced compared to stereo image processing apparatus 100 according to Embodiment 2.

Embodiment 4

Embodiment 4 of the present invention is an example of narrowing down the range of partial images to be clipped using image matching and adopting an inverted phase filter in the phase correlation section. In other words, the present embodiment is an example of further reducing a calculation load.

First, a configuration of a stereo image processing apparatus according to the present embodiment will be described.

Figure 9:
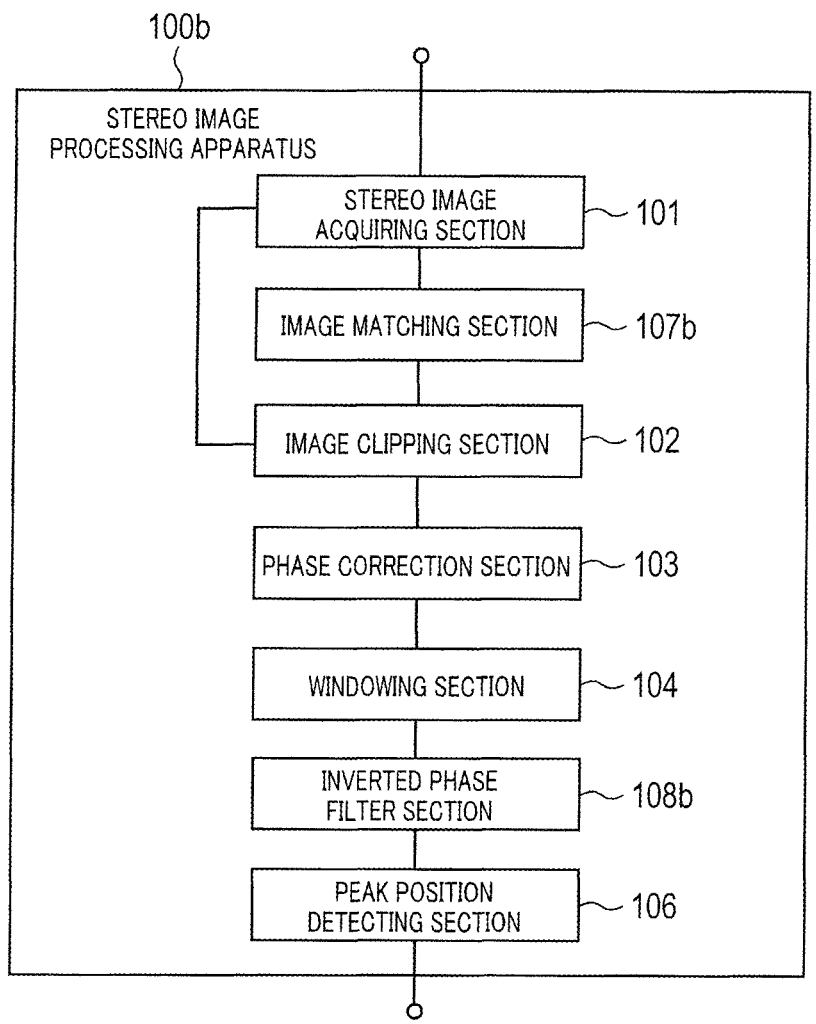
FIG. 9 is a block diagram illustrating a configuration example of a stereo image processing apparatus according to Embodiment 4.

FIG. 9 is a block diagram illustrating an example of a configuration of a stereo image processing apparatus according to the present embodiment and corresponds to FIG. 2 in Embodiment 2. The same reference numerals are assigned to the part identical to FIG. 2, and the description for these components is omitted.

In FIG. 9, stereo image processing apparatus 100b includes image matching section 107b in addition to the configuration in FIG. 2. Furthermore, stereo image processing apparatus 100b includes inverted phase filter section 108b instead of phase correlation section 105 in FIG. 2. Note that inverted phase filter section 108b is phase correlation section 105 changed into a more specific concept.

In the present embodiment, stereo image acquiring section 101 outputs an acquired stereo image to image matching section 107b and image clipping section 102.

<Image Matching Section 107b>

Image matching section 107b acquires a corresponding point of a reference image corresponding to a target point of a target image. The corresponding point acquired here is a corresponding point associated with the target point with pixel-level accuracy. Hereinafter, such a corresponding point will be referred to as "pixel-level corresponding point."

More specifically, image matching section 107b performs an image matching process on the target image and the reference image acquired by stereo image acquiring section 101, and thereby acquires a corresponding point of a reference image corresponding to the target point of the target image. Image matching section 107b then calculates "shift amount n in pixel level" on a position of the corresponding point in the reference image with respect to the position of the target point on an image.

For example, image matching section 107b determines a predetermined one pixel included in the target image as a "target point," and clips, from the target image, a partial image around this "target point" as the center. Hereafter, such a partial image is referred to as "pixel matching target pixel data." Furthermore, image matching section 107*b* clips, from a reference image, a plurality of partial images which are included in the reference image and have the same size as the pixel matching target pixel data. Hereafter, such a partial image is referred to as "pixel matching reference pixel data." Each of the plurality of pieces of pixel matching reference pixel data is clipped from different positions in the reference image. Note that the pixel matching target image data needs only to include the target point and the target point need not always be a center point.

In the case of a stereo image, a disparity between a target image and a reference image is generated only in the baseline length direction of a camera. Therefore, image matching section 107*b* needs only to change the clipping position in the baseline length direction and clip a plurality of pieces of pixel matching reference pixel data. Subsequently, the shift amount between the position of the target point in the target image and the corresponding point in the reference image is calculated as shift amount n described above.

Image matching section 107*b* then identifies, from the plurality of clipped pieces of pixel matching reference pixel data, pixel matching reference pixel data having a highest degree of matching with pixel matching target pixel data. In the identified pixel matching reference pixel data, one pixel corresponding to the target point becomes the corresponding point on the reference image. As an index representing a matching degree, an SAD (Sum of Absolute Differences) representing dissimilarity in intensity is used.

Image matching section 107*b* outputs the position of the target point and the position of the corresponding point in the reference image to image clipping section 102 by outputting information indicating, for example, the position of the target point, shift amount n of the pixel level and the direction of the shift.

In the present embodiment, image clipping section 102 determines the image clipping position in the target image so that the target point is included in the target pixel data. Furthermore, suppose that image clipping section 102 determines the image clipping position in the image so that the corresponding point is included in the reference pixel data. Image clipping section 102 may determine the target pixel data so as to have a size different from the aforementioned pixel matching target pixel data.

In the present embodiment, an assumption is made that windowing section 104 outputs windowed target pixel data and windowed reference pixel data to inverted phase filter section 108*b*.

<Inverted Phase Filter Section 108*b*>

Inverted phase filter section 108*b* calculates an inverted phase filtering coefficient by inverting windowed target pixel data in the array direction. Inverted phase filter section 108*b* calculates a phase correlation value by filtering windowed reference pixel data using the calculated inverted phase filtering coefficient. Details of the filtering process will be described later. Inverted phase filter section 108*b* outputs a phase correlation value which is the filtering result to peak position detecting section 106. Hereinafter such a filtering result is referred to as "filtering result."

In the present embodiment, suppose that peak position detecting section 106 calculates a disparity of the corresponding point based on the output from inverted phase filter section 108*b*.

More specifically, peak position detecting section 106 acquires a relative positional relationship in which the degree of correlation (phase correlation value) between the target pixel data and reference pixel data becomes highest in the filtering result. Peak position detecting section 106 calculates a shift amount of the corresponding point of the reference pixel data corresponding to the target point of the target pixel data based on the acquired relative position relationship. The shift amount acquired here is a shift amount with accuracy on a subpixel level which is more specific than the pixel level.

More specifically, peak position detecting section 106 calculates such a shift amount by detecting a peak position in the filtering result. The peak in the filtering result here is a position at which the filtering result becomes a maximum value. An accurate shift amount (disparity) between the target image and the reference image is calculated by adding up the shift amount on this subpixel level and the shift amount (above-described shift amount n) on the pixel level calculated by image matching section 107*b*.

Stereo image processing apparatus 100*b* includes, for example, a CPU and a storage medium such as a RAM. In this case, each of the functional parts described above is implemented by the CPU executing a control program.

Next, the operation of stereo image processing apparatus 100*b* will be described.

The following description assumes that the image lateral direction is the X-axis, image longitudinal direction is the Y-axis and one pixel is one coordinate point. For the simplicity of explanation, the direction of the epipolar line (baseline-length direction) is parallel to the X-axis in the entire image.

Figure 10:
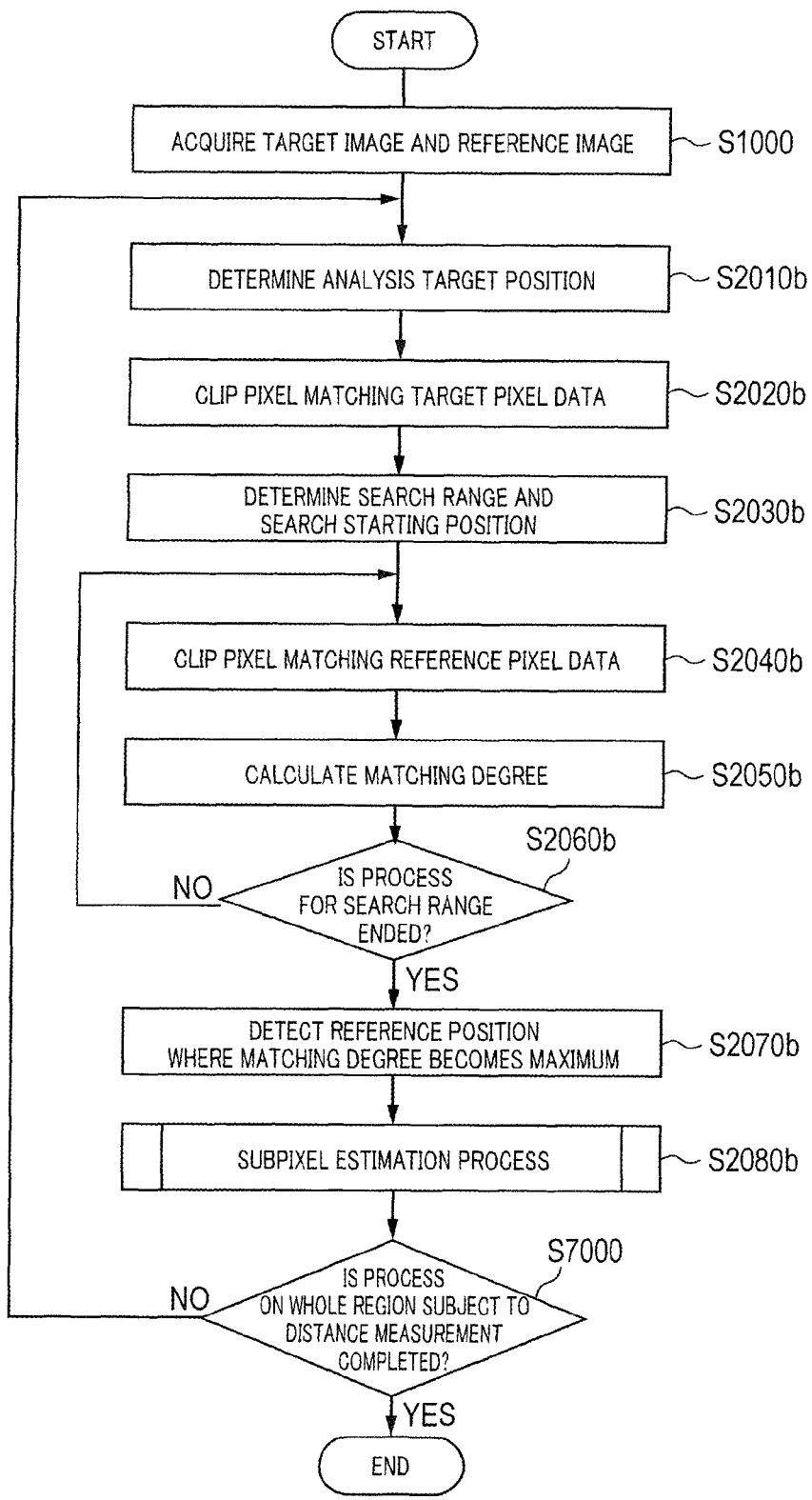
FIG. 10 is a flowchart illustrating an operation example of the stereo image processing apparatus according to Embodiment 4.

FIG. 10 is a flowchart illustrating an example of operation of stereo image processing apparatus 100 and corresponds to FIG. 3 in Embodiment 2. The same reference numerals are assigned to the part identical to FIG. 3, and the description for these components is omitted.

Every time a stereo image is inputted from stereo image acquiring section 101, image matching section 107*b* performs an image matching process on the target image and the reference image while moving the target point in the entire target image. Stereo image processing apparatus 100 performs operation in following steps S2010*b* to S2080*b* on all target points.

<Determining Target Point Position>

In step S2010*b*, image matching section 107*b* determines a position of a target point subject to disparity calculation (analysis target position).

<Clipping Pixel Matching Target Pixel Data>

In step S2020*b*, image matching section 107*b* clips pixel matching target pixel data from the target image.

The pixel matching target pixel data is an image of a partial region including the target point determined in step S2010*b*. The unit of the size of pixel matching target pixel data is pixel as described above. That is, the pixel matching target pixel data is an image of a plurality of pixel rows×a plurality of pixel columns.

<Determining Search Range and Search Start Position>

In step S2030*b*, image matching section 107*b* determines a search range and a search starting position in a reference image based on the position of the target point determined in step S2020*b*.

A disparity of a stereo image is determined based on a baseline length which is a distance between cameras, a focal length of a lens and a distance from a stereo camera to an object of distance measurement based on the principles of triangulation. That is, the disparity is proportional to the baseline length and the focal length and inversely proportional to the distance to the object. The baseline length and the focal length are camera parameters and fixed. For this reason, the search range may be determined based on the distance from the stereo camera to the object of distance measurement. Since the object at infinity from the stereo camera is captured at the same position in the target image and the reference image, the search starting position in the reference image may be the same coordinates as a target point in the target image.

<Clipping Pixel Matching Reference Pixel Data>

In step S2040b, image matching section 107b determines the position of clipping the reference image and clips the pixel matching target pixel data and the pixel matching reference pixel data in which the number of pixel rows is equal to the number of pixel columns.

Image matching section 107b determines the search starting position determined in step S2030b as, for example, a first clipping position and shifts the clipping position thereafter.

<Calculating Matching Degree>

In step S2050b, image matching section 107b calculates the matching degree between the pixel matching target pixel data and the pixel matching reference pixel data. As this matching degree, for example, a SAD value indicating dissimilarity in intensity and similarity in intensity are used.

The index of the matching degree is not limited to the SAD value, but other indexes may also be used as long as they can be used as indexes of the matching degree. For example, image matching section 107b may also use SSD (Sum of Squared Differences) as the index of the matching degree.

<Determining End of Search Range>

In step S2060b, image matching section 107b determines an end of process for the search range. That is, image matching section 107b determines whether or not the search range is completely covered by moving the clipping position.

When the process for the search range has not ended (S2060b: NO), image matching section 107b returns to step S2040b. As a result, image matching section 107b moves the clipping position within the search range so that the clipping region of the pixel matching reference pixel data in step S2040b is shifted. In this way, the processes in steps S2040b to S2060b are repeated until the process for the search range ends (S2060b: YES).

<Detecting Reference Position at Maximum Matching Degree>

In step S2070b, image matching section 107b determines a clipping position based on a plurality of matching degrees obtained by the processes in steps S2040b to S2060b. That is, image matching section 107b identifies a clipping position of pixel matching reference pixel data in which the matching degree becomes a maximum.

When dissimilarity in intensity is used as the matching degree, image matching section 107b identifies a clipping position of pixel matching reference pixel data where the dissimilarity in intensity becomes local minimum or minimum. Image matching section 107b identifies a clipping position where the matching degree becomes a maximum as a corresponding point in a reference image corresponding to a target point.

Here, an overview of processes up to detection of the position at the maximum matching degree (steps S2010 to S2070b in FIG. 10) will be described schematically.

FIG. 11 is a schematic diagram illustrating an overview of processes up to detection of the position at the maximum matching degree.

Figures 11A, 11B, 11C:
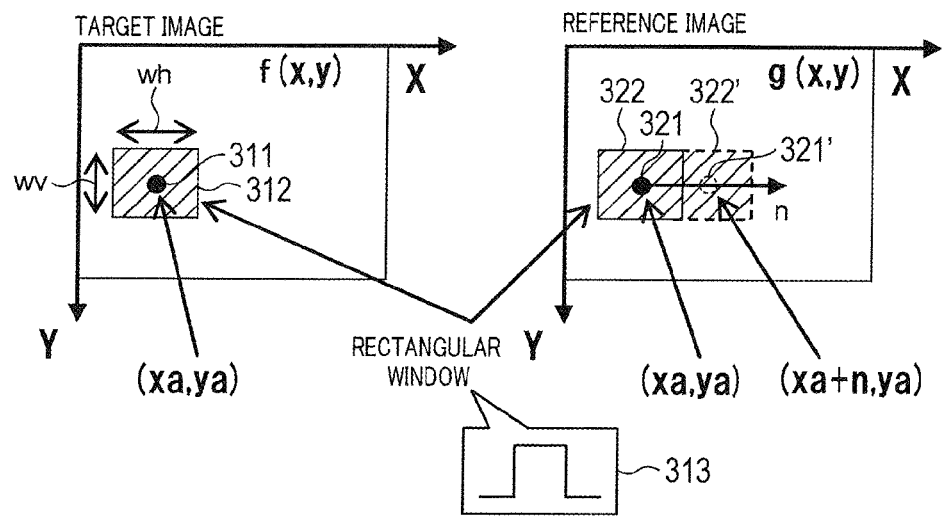
FIGS. 11A to 11C are schematic diagrams illustrating an overview of processing until detection of a maximum position of a matching degree according to Embodiment 4.

As shown in FIG. 11A, image matching section 107b clips a partial image around analysis reference position (reference point) (xa, ya) 311 as the center as pixel matching target pixel data 312 (step S2020b in FIG. 10). For clipping of this pixel matching target pixel data 312, rectangular window 313 having a predetermined size (longitudinal size: wv pixels, lateral size: wh pixels) is used. Here, the description assumes that the center of rectangular window 313 defined by the first window function matches analysis reference position 311, but it need not be precisely the center. That is, analysis target position 311 needs only to be located in the vicinity of the center of rectangular window 313.

Next, image matching section 107b determines a search range and a search starting position in a reference image based on the determined analysis target position (step S2010b in FIG. 10) (step S2030b in FIG. 10). For the search starting position (initial coordinates at which pixel matching reference pixel data is clipped in the reference image), the same coordinates (xa, ya) as the analysis target position in the target image are used.

Next, as shown in FIG. 11B, image matching section 107b clips clipping target position 321 from the reference image using a partial image around the search starting position as the center as pixel matching reference pixel data 322 (step S2040b in FIG. 10). For clipping of this unit reference image 322, the same rectangular window as rectangular window 313 used for clipping of pixel matching target pixel data is used.

As shown in FIG. 11C, image matching section 107b calculates the degree of matching between pixel matching target pixel data 312 and each piece of pixel matching reference pixel data 322 (step S2050b in FIG. 10). An SAD value representing difference in intensity is used for the matching degree, for example. This SAD value is calculated according to following equation 3. [3]

$$SAD(n) = \sum_{j=-wv/2}^{wv/2} \sum_{i=-wh/2}^{wh/2} |f(xa+i, ya+j) - g(xa+i+n, ya+j)| \quad \text{(Equation 3)}$$

As shown in FIG. 11B, when it is determined that the search range has not been completely covered (step S2060b: NO in FIG. 10), image matching section 107b shifts the clipping position and clips new pixel matching reference pixel data 322' from the reference image. The clipping position is shifted by one pixel here. The direction of the shift is in the direction of the rightward arrow extending from the coordinates (xa, ya) of the reference image in FIG. 11B.

By this means, image matching section 107b calculates a plurality of SAD values about a plurality of pieces of pixel matching reference pixel data 322 for one piece of pixel matching target pixel data 312. Image matching section 107b then identifies pixel matching reference pixel data whose matching degree becomes a maximum based on a plurality of matching degrees. More specifically, image matching section 107b identifies pixel matching reference pixel data 322' corresponding to, for example, a minimum SAD value among a plurality of SAD values. When coordinates of the identified pixel matching reference pixel data at clipping target position 321' are assumed to be (xa+n, ya), n is a shift amount in pixel units. Image matching section 107b assumes clipping target position 321' whose SAD value becomes a minimum to be a corresponding point on a pixel level of target position 321 (target point).

<Subpixel Estimation>

In step S2080b in FIG. 10, stereo image processing apparatus 100b performs a subpixel estimation process. The subpixel estimation process is a process of estimating a shift amount of the accuracy on a subpixel level of the corresponding point corresponding to the target point. Stereo image processing apparatus 100b performs a subpixel estimation process based on the target point set in S2010b, the corresponding point in the reference image obtained in step S2070b and the target image and reference image inputted by stereo image acquiring section 101.

Figure 12:
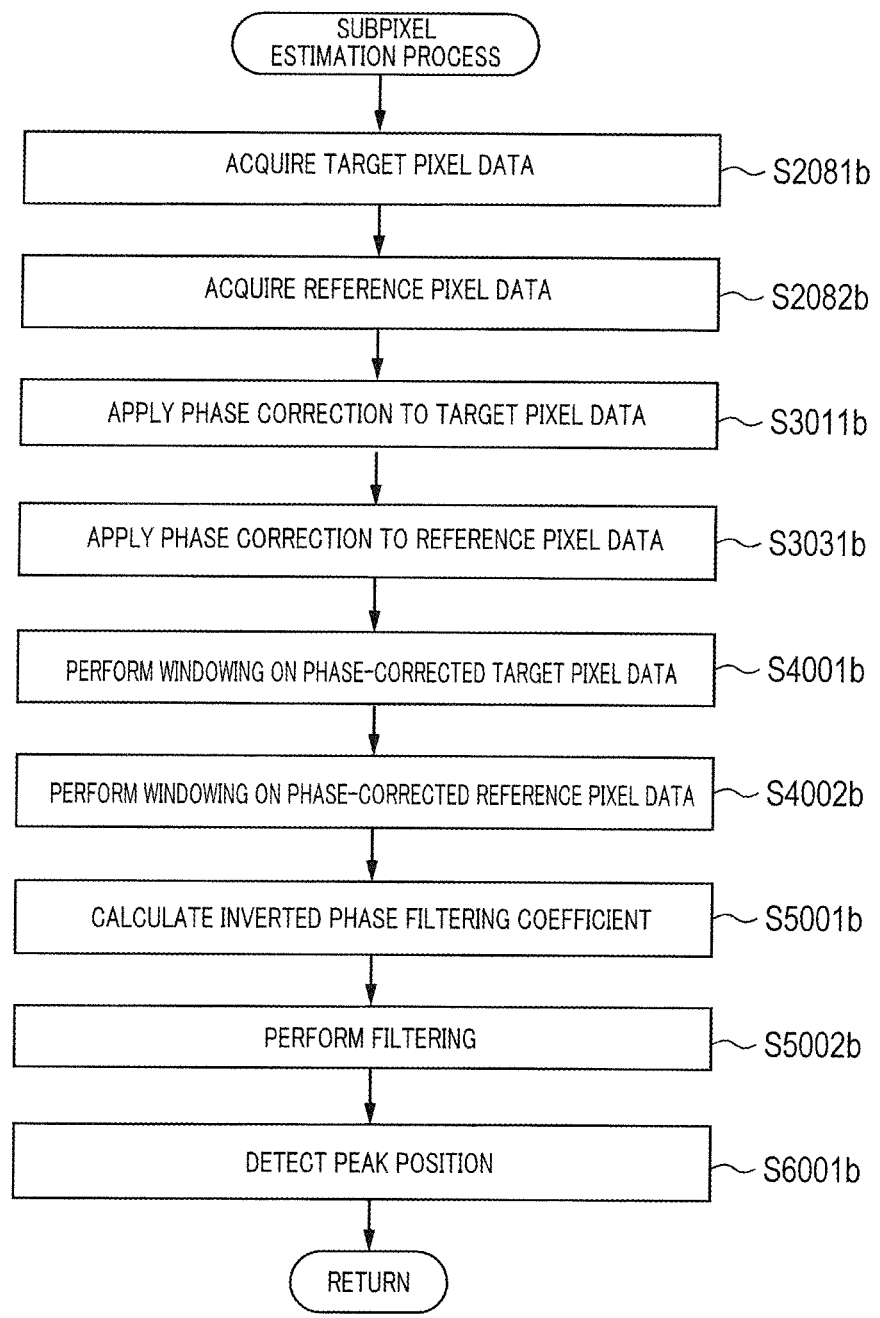
FIG. 12 is a flowchart illustrating an operation example of subpixel estimation processing according to Embodiment 4.

FIG. 12 is a flowchart illustrating details of the subpixel estimation processing.

<Clipping of Target Pixel Data>

In step S2081b, image clipping section 102 clips a partial image around the target point from the target image and acquires the target pixel data. A rectangular window is used for clipping of the partial image which becomes the basis of this target pixel data.

<Clipping Reference Pixel Data>

In step S2082b, image clipping section 102 clips a partial image around the corresponding point detected in step S2070b from the reference image and acquires reference pixel data. The same rectangular window as that for reference pixel data is used to acquire this reference pixel data.

Note that the size of the rectangular window may be different from that used for clipping of the pixel matching target pixel data. In the present embodiment, the target pixel data has been described as to be newly acquired from the target image, but the present invention is not limited to this. Image clipping section 102 may use the pixel matching target pixel data used in image matching section 107b as target pixel data as is.

<Phase-Correcting Target Pixel Data>

In step S3011b, phase correction section 103 phase-corrects target pixel data.

<Phase-Correcting Reference Pixel Data>

In step S3031b, phase correction section 103 phase-corrects reference pixel data.

<Windowing Phase-Corrected Target Pixel Data>

In step S4001b, windowing section 104 performs windowing on the phase-corrected target pixel data using a second window function. The second window function is, for example, a window function of a Hanning window.

<Windowing Phase-Corrected Reference Pixel Data>

In step S4002b, windowing section 104 performs windowing on the phase-corrected reference pixel data using a window function similar to that used for the phase-corrected target pixel data.

Note that, here, a window function of the Hanning window is used for description. However, the present invention is not limited to this example, and the Hamming window, the Blackman window, the Kaiser window and others may be used as the window function as described above. The window function is selected according to characteristics to be focused on, among characteristics of the target pixel data (for example, frequency power characteristics, phase characteristics, and cutting edge continuity). For example, the Kaiser window is suitable for focusing on the phase characteristics. However, the Kaiser window would make the arithmetic operation very complicated. In contrast, the Hanning window is suitable for reducing the computational complexity.

Here, it is important for the sub-pixel estimation process not to include noise in the clipped partial image. This is because it is important to calculate the shift amount in the sub-pixel level highly accurately. In contrast, image clipping by image matching section 107b is performed on a per-pixel basis, for example, and for this reason, reduction in the number of operations is more important than the accuracy of image clipping.

Therefore, a window function that simply clips image data is used as the first window function used in image matching section 107b. On the other hand, it is important for the second window function used in the sub-pixel estimation process not to include noise. Accordingly, it is preferable for the second window function to be a function having a continuous change at the ends of the window (function having zero as values at the ends of the window).

By using the second window function, continuity in the target pixel data and the reference pixel data is maintained, and the noise component due to clipping, included in the characteristics of the inverted phase filter to be described is reduced. Note that, comparison of frequency characteristics between the first window function and the second window function shows that the first window function has a narrower main-lobe and a wider side-lobe than the second window function.

<Calculating Inverted Phase Filtering Coefficient>

In step S5001b, inverted phase filter section 108b calculates an inverted phase filtering coefficient from the windowed target pixel data. More specifically, inverted phase filter section 108b sorts the signal column in a reverse order by inverting the positions of the pixel values in the windowed target pixel data in the array direction.

<Filtering>

In step S5002b, inverted phase filter section 108b filters the windowed reference pixel data using the inverted phase filtering coefficient calculated in step S5001b.

<Detecting Peak Position>

In step S6001b, peak position detecting section 106 calculates a shift amount (disparity) in the subpixel level between the target image and the reference image based on the peak position detected in the filtering result. The disparity from the target point in the target image is calculated by adding shift amount n on the pixel level and shift amount 6' on the sub-pixel level. The process of stereo image processing apparatus 100 returns to the flowchart in FIG. 10.

Note that the order of processes in steps S2081b to S5002b is not limited to the order shown in the flowchart in FIG. 12. S2081b, S3011b and S4001b which are the processes relating to the target image, and S2082b, S3031b and S4002b which are the processes relating to the reference image need only to be executed in these orders respectively. The processes in S2081b to S4002b need only to be completed before S5001b.

Hereinafter, an overview of the subpixel estimation process (FIG. 12) will be described schematically.

FIGS. 13A to 13C are schematic diagrams illustrating an overview of the processes (steps S2081b to S5002b in FIG. 12) after the clipping of the partial image until the calculation of the inverted phase filtering coefficient.

As shown in FIG. 13A, image clipping section 102 acquires target pixel data 353 made up of M pixel values from the target image. As shown in FIG. 13B, image clipping section 102 acquires reference pixel data 356 made up of M pixel values from the reference image.

Windowing section 104 uses a Hanning window having an M-pixel size centered on a reference point (xa, ya) and a corresponding point (xa+n, ya) on the pixel level as second window function w(m) 357. The size of the second window function w (m) is not limited to M.

Inverted phase filter section 108b need not always calculate the inverted phase filtering coefficient separately and needs only to perform operation so that a filtering result when an inverted phase filtering coefficient is applied can be obtained. That is, as shown in FIG. 13C, inverted phase filter section 108b performs a filtering process using, for example, equation 4 shown below. Here, f'(m) denotes a pixel value of the target image and g'(m) denotes a pixel value of the reference image.

[4]

$$z(m) = \sum_{k=-M/2}^{M/2} f'(-k) \times g'(m-k) \quad \text{(Equation 4)}$$

Figure 14A:
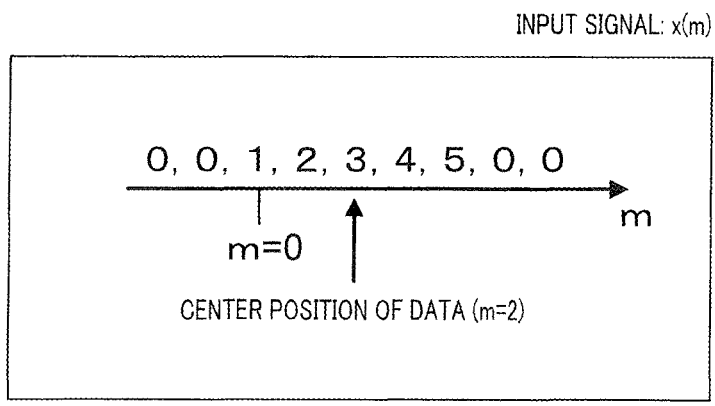
FIGS. 14A to 14C are schematic diagrams for describing a concept of filtering using the inverted phase filtering coefficient according to Embodiment 4.
Figure 14B:
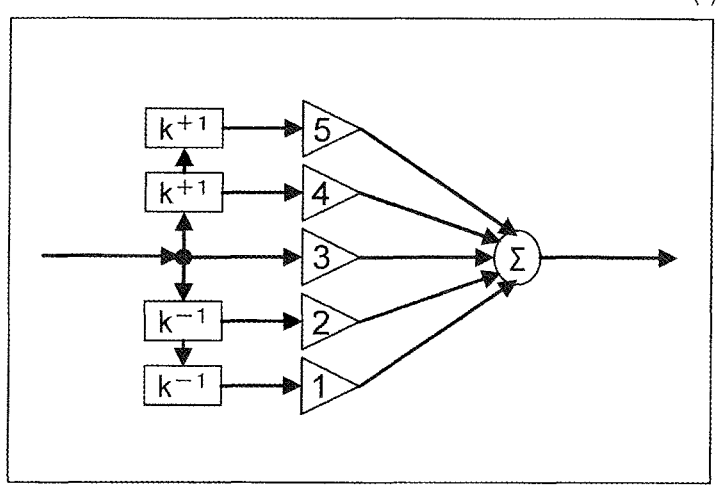
Figure 14C:
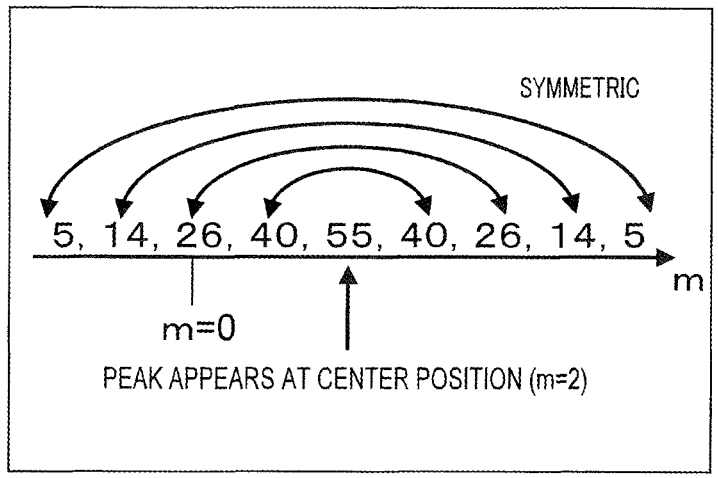

FIGS. 14A to 14C are schematic diagrams for describing a concept of filtering according to the inverted phase filtering coefficient (step S5002b in FIG. 12).

In FIGS. 14A to 14C, the length (M) of the window function w (m) is 5 pixels. Suppose that the target pixel data on which folding noise is removed and windowing is performed is "1, 2, 3, 4, 5." In addition, the reference pixel data x (m) on which the folding noise is removed and windowing is performed is "1, 2, 3, 4, 5". The pixel value used for filtering is an intensity value.

When the target pixel data is "1, 2, 3, 4, 5," inverted phase filter section 108b calculates "5, 4, 3, 2, 1" as the inverted phase filtering coefficient h(k).

Subsequently, inverted phase filter section 108b filters the reference pixel data using inverted phase filtering coefficient h (k), as illustrated in FIG. 14B.

More specifically, the filtering process is performed as follows. When a coordinate of given composition signals in the reference pixel data is k, inverted phase filter section 108b filters a signal sequence having coordinates "k−2, k−1, k, k+1, k+2" by multiplying the signal sequence by an inverted phase filtering coefficient h(k). Inverted phase filter section 108b then calculates the sum total of the respective multiplication results as a filtering result z(m). Here, m is an integer from 0 to 4.

When a virtual coordinate point having intensity 0 is considered outside both ends of the reference pixel data, as shown in FIG. 14A, reference pixel data x(m) becomes "0, 0, 1, 2, 3, 4, 5, 0, 0." When m (m: 0 to 4) in FIG. 14A is assumed to be coordinate points of the reference pixel data (that is, x(0)=1, x(1)=2, x(2)=3, x(3)=4, x(4)=5), filtering is performed as follows.

When m=0, inverted phase filter section 108b filters intensity value signal column "0, 0, 1, 2, 3" having m=0 as the center by the inverted phase filter "5, 4, 3, 2, 1." As a result, z (0) is 26 (=0×1+0×2+1×3+2×4+3×5).

When m=1, inverted phase filter section 108b also filters an intensity value signal column "0, 1, 2, 3, 4" having m=1 as the center by the inverted phase filter "5, 4, 3, 2, 1." As a result, z (1) is 40 (=0×1+1×2+2×3+3×4+4×5).

As a result of the calculation in the same manner, z (2) is 55, z (3) is 40, and z (4) is 26.

Therefore, inverted phase filter section 108b obtains "26, 40, 55, 40, 26" as the filtering result z(m).

Such filtering is expressed by aforementioned equation 4. In equation 4, f' (−k) with the target pixel data inverted is used as filtering coefficient h (k) of the inverted phase filter. Moreover, g'(m) denotes an intensity value of the reference pixel data.

Filtering result z (m) by filtering using the inverted phase filter has a feature that the filtering result z (m) is symmetric (in FIGS. 14A to 14C, horizontally symmetric having m=2 as the center), and the peak exists near the center as illustrated in FIG. 14C.

The inverted phase filter corresponds to a type of FIR filter, and is characterized in that the inverted phase filter is the linear shift invariant system. Here, the linear shift invariant system refers to a system with which the output signal has a shift of the same amount as the shift in the input signal.

In the above-described specific example, a case has been described as an example where there is no shift between the target pixel data and the reference pixel data. However, when the shift smaller than the sampling distance is present in the reference pixel data with respect to the target pixel data, the same shift is present in z (m) which denotes the filtering result.

Note that, when calculating the disparity of an object of the same size in the real space, the disparity is reduced in the case where the object is far from the stereo camera than in the case where the object is close to the stereo camera, and the shift amount n in the pixel level is reduced as well. At the same time, the size of image region of the object in the baseline-length direction is reduced as well.

Accordingly, it is preferable for stereo image processing apparatus 100 to set the number of taps in the inverted phase filter according to the size of shift amount n in the pixel level detected by image matching section 107b.

For example, when the shift amount n in the pixel level is small, the tap length of the inverted phase filter is set to be short accordingly. In other words, when calculating the disparity of an object in the same size in the real space, the disparity is smaller and the shift amount n in the pixel level is smaller in the case where the object is far from the stereo camera than in the case where the object is close to the stereo camera. At the same time, the size of the image captured is small. Accordingly, the tap length of the inverted phase filter may be adaptively changed by changing the size of the target pixel data and the reference pixel data. With this, a disparity adjusted to the size of the object to be ranged can be calculated.

The filtering result is the output of the linear shift invariant system. Accordingly, the filtering result theoretically represents the true shift amount except for the error in correcting distortion of a lens, an error including gain noise caused by an image sensor such as CCD, and an error in the operation accuracy when clipping an image by performing windowing. Therefore, a true peak position on the sub-pixel level can be calculated from output of the inverted phase filter discretized per pixel, by interpolating numbers between pixels according to a sampling theorem.

Figure 15:
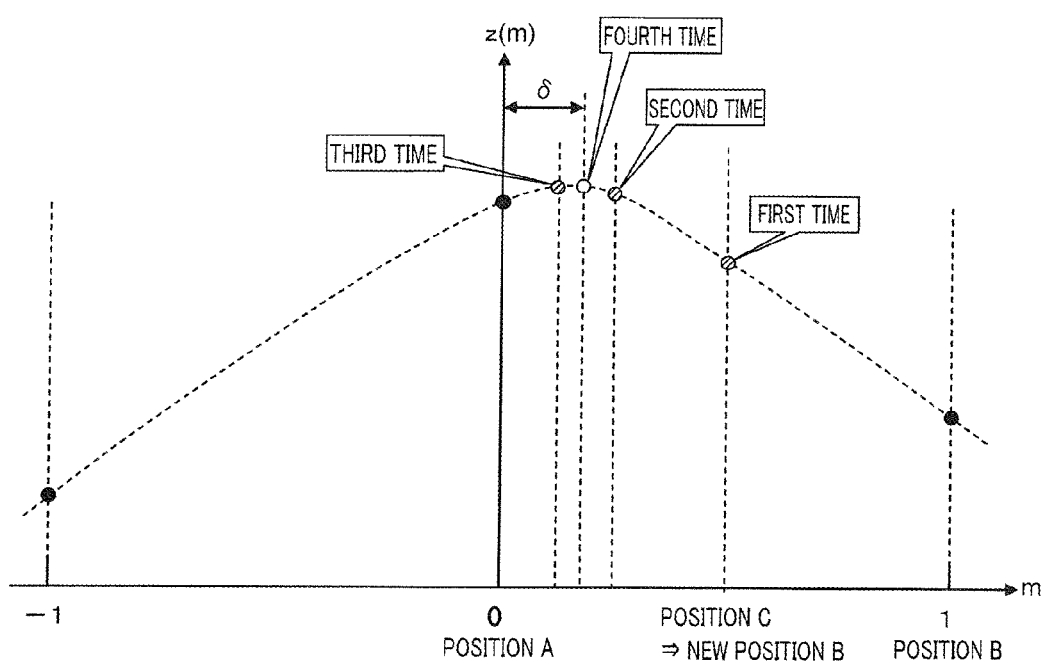
FIG. 15 is a schematic diagram illustrating an overview of an example of peak position detection processing using a sinc function according to Embodiment 4.

FIG. 15 is a schematic diagram illustrating an overview of an example of a process of peak position detection (step S6001b in FIG. 12). Here, an overview of the process of peak position detection using a sinc function is shown.

Sinc function is a function defined by sin (πx)/πx, and is a function used for returning discrete sampling data into original contiguous data. The sampling theorem proves that the original contiguous data can be fully recovered by performing convolution operation of sampled discrete data and sinc function.

Accordingly, peak position detecting section 106 performs convolution operation using sinc function on discrete filtering results. With this, peak position detecting section 106 can interpolate signal data of a distance per pixel, and derive a true peak position of the filtering result z (m) with signal data interpolated theoretically on the sub-pixel level.

As illustrated in FIG. 15, peak position detecting section 106 detects a peak position by a binary search, for example.

For example, peak position detecting section 106 uses a position m=0 as position A where the filtering result z (m) is the maximum (that is, a target point for the binary search). Peak position detecting section 106 compares z (+1) and z (−1) which are filtering results of the position shifted by one pixel to the left and right from maximum position A. Peak position detecting section 106 determines a position with a larger filtering result (here, m=1) as point B (that is, point used for the binary search).

Peak position detecting section 106 calculates a value of position C which is a midpoint between binary search target point A and binary search point B using, for example, equation 5 shown below, based on the sampling theorem.

[5]

$$Z(m) = \sum_{n=-\infty}^{\infty} Z(n) \frac{\sin(\pi(m-n))}{\pi(m-n)} \quad \text{(Equation 5)}$$

Peak position detecting section 106 repeats the process as described above using position C as a new target point for the binary search.

The number of repetitions of this process may be a number according to a necessary accuracy. More specifically, peak position detecting section 106 may perform the process described above once, if the necessary sub-pixel accuracy is ½ pixel. Peak position detecting section 106 may determine the number of repetitions according to the necessary sub-pixel accuracy, for example, twice if the necessary sub-pixel accuracy is ¼ pixel, and three times if the necessary sub-pixel accuracy is ⅛ pixel.

Peak position detecting section 106 uses the midpoint obtained at the end as the detected peak position δ.

Note that, in the description above, the peak position was detected using the sinc function and the binary search. However, the present invention is not limited to this example, and peak position detecting section 106 may search a peak position based on a combination of the sinc function and the gradient method. That is, peak position detecting section 106 can use various maximum value detecting methods after performing, using the sinc function, convolution operation on the discrete filtering result so as to interpolate the signal data in the distance between pixel units.

Alternatively, peak position detecting section 106 may detect a peak position using quadratic curve approximation. With this, peak position detecting section 106 can reduce the amount of calculation of the peak position. In this case, peak position detecting section 106 fits the discrete filtering result into the quadratic curve, and detects a position of the local maximum value of the quadric curve as the peak position. With this, peak position detecting section 106 can calculate the peak position at accuracy equal to or smaller than the distance for the discretization.

Figure 16:
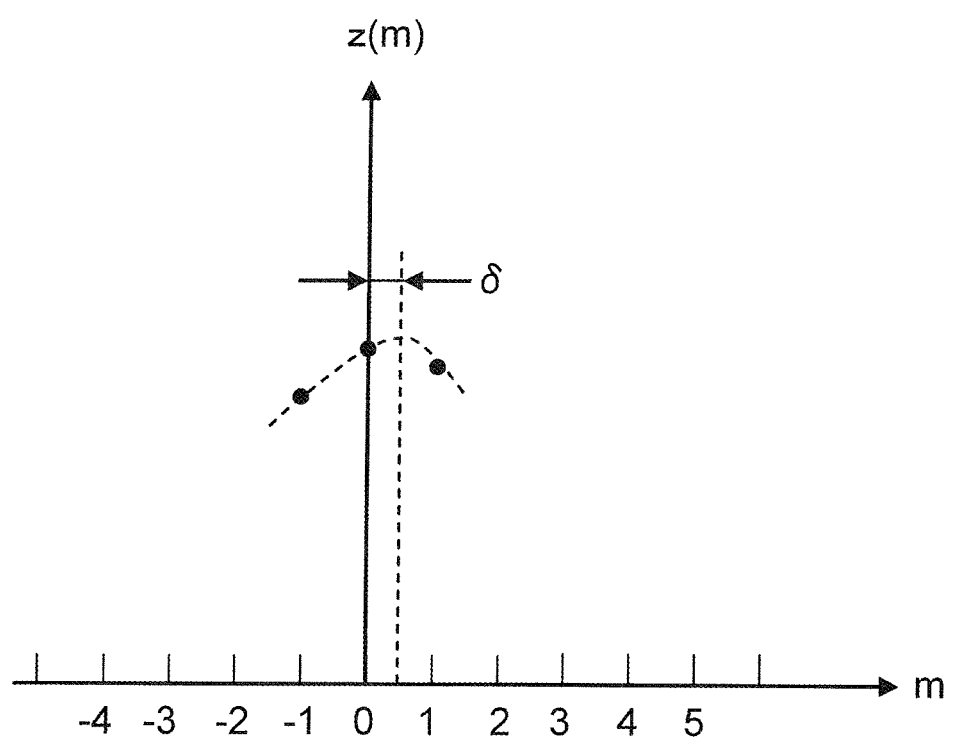
FIG. 16 is a schematic diagram illustrating an overview of an example of peak position detection using secondary curve approximation according to Embodiment 4.

FIG. 16 is a schematic diagram illustrating an overview of an example of process (step S6001b in FIG. 12) for detecting the peak position using the quadratic curve approximation.

As illustrated in FIG. 16, peak position detecting section 106 first calculates value z (0) at position m=0, which makes the filtering result z (m) in units of pixels maximum. Peak position detecting section 106 also obtains z (+1), z (−1), which are filtering results of the positions m=+1, −1, shifted by one pixel from the maximum position m=0 to the left and right, respectively. Subsequently, peak position detecting section 106 calculates a quadratic curve passing through the three points, and detects a position where the quadratic curve is at its local maximum value as peak position δ. The peak position δ can be calculated using, for example, following Equation 6.

[6]

$$\delta = \frac{z(-1) - z(+1)}{2 \times \{z(-1) + z(+1) - 2 \times z(0)\}} \quad \text{(Equation 6)}$$

In the description above, stereo image processing apparatus 100b calculates an inverted phase filtering coefficient based on the target pixel data and applies filtering to the reference pixel data using the inverted phase filtering coefficient. However, on the contrary, stereo image processing apparatus 100b may calculate an inverted phase filtering coefficient based on the reference pixel data and apply filtering to the target pixel data using the inverted phase filter. This is because the target pixel data and reference pixel data are equivalent data in the sense that they are one and other representations of the same stereo image.

As described above, stereo image processing apparatus 100b according to the present embodiment narrows down partial images to be clipped through image matching and calculates a disparity using an inverted phase filter. This allows stereo image processing apparatus 100b according to the present embodiment to calculate, highly accurately, the disparity of an object having a small image region size in the baseline length direction with reduced calculation load.

It should be noted that functional sections in stereo image processing apparatus according to embodiments described above may be each configured as integrated circuit. Each functional section of the stereo image processing apparatus may be individually implemented as one chip, or a plurality of functions sections may be integrated into one chip. The integrated circuit used may be an LSI (large scale integration), IC (integrated circuit), a system LSI, a super LSI, or an ultra LSI, depending on the degree of integration. The integrated circuit may be implemented by a dedicated circuit or a general-purpose processor. Alternatively, the integrated circuit may be an FPGA (field programmable gate array) that can be programmed after fabrication, or a configurable processor having connection or settings of internal circuit cells that can be reconfigured. Furthermore, functional sections of the stereo image processing apparatus may be implemented as integration by a technology for other integration replacing LSI, along with the progress in the semiconductor technology and another technology derived.

A stereo image processing apparatus according to the present disclosure includes: a stereo image acquiring section that acquires a target image and a reference image of a stereo image; an image clipping section that clips partial images parallel to a baseline length direction of the stereo image from the target image and the reference image respectively and acquires one-dimensional pixel data sequences each indicating a distribution of pixel values of a corresponding one of the partial images in the baseline length direction; a phase correction section that performs a phase correction process on each of target pixel data and reference pixel data, the phase correction process being a process which makes values of the target pixel data more symmetric when applied to the target pixel data that is the one-dimensional pixel data sequence acquired from the target image, the reference pixel data being the one-dimensional pixel data sequence acquired from the reference image; a windowing section that performs windowing on phase-corrected target pixel data obtained by performing the phase correction process on the target pixel data and phase-corrected reference pixel data obtained by performing the phase correction process on the reference pixel data respectively; a phase correlation section that calculates a phase correlation value indicating a degree of correlation between windowed target pixel data obtained by performing the windowing on the phase-corrected target pixel data and windowed reference pixel data obtained by performing the windowing on the phase-corrected reference pixel data; and a peak position detecting section that calculates a disparity of a corresponding point in the reference image corresponding to a target point in the target image based on the phase correlation value.

In the stereo image processing apparatus according to the disclosure, the phase correction section includes: a target pixel data phase zeroing section that performs a phase zeroing process of zeroing a phase of each frequency component on the target pixel data and thereby calculates the phase-corrected target pixel data; a phase correction filter calculating section that calculates a phase correction filter that makes values of the target pixel data symmetric based on the target pixel data and the phase-corrected target pixel data when applied to the target pixel data; and a reference pixel data phase correction section that calculates the phase-corrected reference pixel data by applying the phase correction filter to the reference pixel data.

In the stereo image processing apparatus according to this disclosure, the phase zeroing process includes a process in which one-dimensional Fourier transform, removal of an imaginary number component and one-dimensional inverse Fourier transform are performed on the target pixel data in the order named, and the phase correction filter includes a filter calculated by dividing a value obtained by performing one-dimensional Fourier transform on the phase-corrected target pixel data, by a value obtained by performing one-dimensional Fourier transform on the target pixel data.

In the stereo image processing apparatus according to this disclosure, the phase correction section includes: a target pixel data phase shift section that applies a phase shift filter which shifts phases of some or all frequency components by 90 degrees with respect to the target pixel data and that calculates phase-shifted target pixel data; a symmetry determination value calculating section that calculates symmetry determination values indicating symmetry of values for the phase-shifted target pixel data and the reference pixel data respectively; a symmetry determination value comparison section that compares the symmetry determination value calculated from the phase-shifted target pixel data with the symmetry determination value calculated from the target pixel data and that determines whether or not the symmetry of the phase-shifted target pixel data is higher than the symmetry of the target pixel data; and a reference pixel data phase shift section that applies the phase shift filter to the reference pixel data and that calculates phase-shifted reference pixel data, and the windowing section handles, when the symmetry of the phase-shifted target pixel data is higher than the symmetry of the target pixel data, the phase-shifted target pixel data and the phase-shifted reference pixel data as the phase-corrected target pixel data and the phase-corrected reference pixel data respectively, and handles, when the symmetry of the phase-shifted target pixel data is not higher than the symmetry of the target pixel data, the target pixel data and the reference pixel data as the phase-corrected target pixel data and the phase-corrected reference pixel data respectively.

In the stereo image processing apparatus according to the present disclosure, the phase shift filter is a differential filter.

In the stereo image processing apparatus according to this disclosure, the phase correlation section calculates an inverted phase filtering coefficient by inverting the windowed target pixel data in an array direction, filters the windowed reference pixel data using the inverted phase filtering coefficient and thereby calculates the phase correlation value.

The stereo image processing apparatus according to the present disclosure further includes an image matching section that acquires the corresponding point on a pixel level, in which the image clipping section determines a clipping position of the partial image so that the target point and the corresponding point are included in the partial image, and the peak position detecting section calculates a disparity of the corresponding point on a subpixel level corresponding to a target point in the target image based on the phase correlation value.

A stereo image processing method according to the present disclosure includes: acquiring a target image and a reference image of a stereo image; clipping partial images parallel to a baseline length direction of the stereo image from the target image and the reference image respectively and acquiring one-dimensional pixel data sequences each indicating a distribution of pixel values of a corresponding one of the partial images in the baseline length direction; performing a phase correction process on each of target pixel data and reference pixel data, the phase correction process being a process which makes values of the target pixel data more symmetric when applied to the target pixel data that is the one-dimensional pixel data sequence acquired from the target image, the reference pixel data being the one-dimensional pixel data sequence acquired from the reference image; performing windowing on phase-corrected target pixel data obtained by performing the phase correction process on the target pixel data and phase-corrected reference pixel data obtained by performing the phase correction process on the reference pixel data respectively; calculating a phase correlation value indicating a degree of correlation between windowed target pixel data obtained by performing the windowing on the phase-corrected target pixel data and windowed reference pixel data obtained by performing the windowing on the phase-corrected reference pixel data; and calculating a disparity of a corresponding point in the reference image corresponding to a target point in the target image based on the phase correlation value.

The disclosure of Japanese Patent Application No. 2012-214974, filed on Sep. 27, 2012, including the specification, drawings and abstract is incorporated herein by reference in its entirety.

INDUSTRIAL APPLICABILITY

The stereo image processing apparatus and the stereo image processing method according to the present invention are useful as a stereo image processing apparatus and a stereo image processing method capable of calculating disparity highly accurately for an object having a small image region size in the baseline length direction.

REFERENCE SIGNS LIST 100, 100a, 100b Stereo image processing apparatus
101 Stereo image acquiring section
102 Image clipping section
103, 103a Phase correction section
104 Windowing section
105 Phase correlation section
106 Peak position detecting section
107b Image matching section
108b Inverted phase filter section
201 Target pixel data phase zeroing section
202 Phase correction filter calculating section
203 Reference pixel data phase correction section
301a Target pixel data phase shift section
302a Symmetry determination value calculating section
303a Symmetry determination value comparison section
304a Reference pixel data phase shift section

The invention claimed is:

1. A stereo image processing apparatus comprising:
a stereo image acquiring section that acquires a target image and a reference image of a stereo image;
an image clipping section that clips partial images parallel to a baseline length direction of the stereo image from the target image and the reference image respectively and acquires one-dimensional pixel data sequences each indicating a distribution of pixel values of a corresponding one of the partial images in the baseline length direction;
 a target pixel data phase shift section that applies a phase shift filter which shifts phases of some or all frequency components by 90 degrees with respect to the target pixel data and that calculates phase-shifted target pixel data;
 a symmetry determination value calculating section that calculates symmetry determination values indicating symmetry of values for the phase-shifted target pixel data and the reference pixel data respectively;
 a symmetry determination value comparison section that compares the symmetry determination value calculated from the phase-shifted target pixel data with the symmetry determination value calculated from the target pixel data and that determines whether or not the symmetry of the phase-shifted target pixel data is higher than the symmetry of the target pixel data;
 a reference pixel data phase shift section that applies the phase shift filter to the reference pixel data and that calculates phase-shifted reference pixel data,
a windowing section that performs windowing on phase-corrected target pixel data obtained by performing the phase correction process on the target pixel data and phase-corrected reference pixel data obtained by performing the phase correction process on the reference pixel data respectively;
a phase correlation section that calculates a phase correlation value indicating a degree of correlation between windowed target pixel data obtained by performing the windowing on the phase-corrected target pixel data and windowed reference pixel data obtained by performing the windowing on the phase-corrected reference pixel data; and
a peak position detecting section that calculates a disparity of a corresponding point in the reference image corresponding to a target point in the target image based on the phase correlation value, wherein
the windowing section handles, when the symmetry of the phase-shifted target pixel data is higher than the symmetry of the target pixel data, the phase-shifted target pixel data and the phase-shifted reference pixel data as the phase-corrected target pixel data and the phase-corrected reference pixel data respectively, and handles, when the symmetry of the phase-shifted target pixel data is not higher than the symmetry of the target pixel data, the target pixel data and the reference pixel data as the phase-corrected target pixel data and the phase-corrected reference pixel data respectively.

2. The stereo image processing apparatus according to claim 1, wherein the phase shift filter is a differential filter.

3. A stereo image processing method comprising:
acquiring a target image and a reference image of a stereo image;
clipping partial images parallel to a baseline length direction of the stereo image from the target image and the reference image respectively and acquiring one-dimensional pixel data sequences each indicating a distribution of pixel values of a corresponding one of the partial images in the baseline length direction;
applying a phase shift filter which shifts phases of some or all frequency components by 90 degrees with respect to the target pixel data and which calculates phase-shifted target pixel data;
calculating symmetry determination values indicating symmetry of values for the phase-shifted target pixel data and the reference pixel data respectively;
comparing the symmetry determination value calculated from the phase-shifted target pixel data with the symmetry determination value calculated from the target pixel data and determining whether or not the symmetry of the phase-shifted target pixel data is higher than the symmetry of the target pixel data;
applying the phase shift filter to the reference pixel data and calculating phase-shifted reference pixel data,
performing windowing on phase-corrected target pixel data obtained by performing the phase correction process on the target pixel data and phase-corrected reference pixel data obtained by performing the phase correction process on the reference pixel data respectively;
calculating a phase correlation value indicating a degree of correlation between windowed target pixel data obtained by performing the windowing on the phase-corrected target pixel data and windowed reference pixel data obtained by performing the windowing on the phase-corrected reference pixel data; and
calculating a disparity of a corresponding point in the reference image corresponding to a target point in the target image based on the phase correlation value, wherein
the performing windowing handles, when the symmetry of the phase-shifted target pixel data is higher than the symmetry of the target pixel data, the phase-shifted target pixel data and the phase-shifted reference pixel data as the phase-corrected target pixel data and the phase- corrected reference pixel data respectively, and handles, when the symmetry of the phase-shifted target pixel data is not higher than the symmetry of the target pixel data, the target pixel data and the reference pixel data as the phase-corrected target pixel data and the phase-corrected reference pixel data respectively.

* * * * *